United States Patent
Tamura

(10) Patent No.: US 12,556,040 B2
(45) Date of Patent: Feb. 17, 2026

(54) POWER RECEIVING APPARATUS, METHOD FOR POWER RECEIVING APPARATUS, AND STORAGE MEDIUM

(71) Applicant: CANON KABUSHIKI KAISHA, Tokyo (JP)

(72) Inventor: Ichiro Tamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/737,335

(22) Filed: Jun. 7, 2024

(65) Prior Publication Data

US 2024/0333041 A1    Oct. 3, 2024

Related U.S. Application Data

(63) Continuation of application No. PCT/JP2022/041930, filed on Nov. 10, 2022.

(30) Foreign Application Priority Data

Dec. 9, 2021  (JP) ................. 2021-200208

(51) Int. Cl.
    *H02J 50/60*    (2016.01)
    *H02J 50/10*    (2016.01)
    *H02J 50/80*    (2016.01)

(52) U.S. Cl.
    CPC .............. *H02J 50/60* (2016.02); *H02J 50/10* (2016.02); *H02J 50/80* (2016.02)

(58) Field of Classification Search
    CPC ............. H02J 50/60; H02J 50/80; H02J 50/10
    USPC ........................................................ 307/104
    See application file for complete search history.

(56) References Cited

U.S. PATENT DOCUMENTS

| 10,256,674 B2 * | 4/2019 | Dimke ................. H02J 50/80 |
| 2016/0352155 A1 * | 12/2016 | Iwasaki ................. H02J 50/12 |
| 2017/0093212 A1 * | 3/2017 | Nagamine ............... H02J 50/10 |
| 2018/0342907 A1 * | 11/2018 | Dimke ................. B60L 53/122 |
| 2019/0081516 A1 * | 3/2019 | Shahsavari ............. H02J 50/60 |

(Continued)

FOREIGN PATENT DOCUMENTS

| EP | 3879671 A1 | 9/2021 |
| JP | 2015027172 A | 2/2015 |

(Continued)

*Primary Examiner* — Alfonso Perez Borroto
(74) *Attorney, Agent, or Firm* — Canon U.S.A., Inc., IP Division

(57) ABSTRACT

A power receiving apparatus (401) includes a coil (205) that wirelessly receives electric power from a power transmission apparatus, communication means (204) for transmitting at a predetermined interval a signal for executing a detection process to detect an object, different from the power transmission apparatus or the power receiving apparatus, in accordance with a value of voltage or current at least at two time points in a predetermined period in which the power transmission apparatus restricts transmission of electric power and receives, from the power transmission apparatus, a response signal including a detection result based on the detection process executed in accordance with a signal transmitted, and control means (201) for, in a case where the detection result included in the response signal received satisfies a predetermined condition, executing control such that the signal is transmitted at an interval shorter than a predetermined interval.

12 Claims, 11 Drawing Sheets

(56) References Cited

U.S. PATENT DOCUMENTS

| | | | | |
|---|---|---|---|---|
| 2020/0144868 A1* | 5/2020 | Niwa | ................. | B60L 53/38 |
| 2021/0175756 A1* | 6/2021 | Tachiwa | ................. | H02J 50/10 |

FOREIGN PATENT DOCUMENTS

| | | | |
|---|---|---|---|
| JP | 2017070074 | A | 4/2017 |
| JP | 2018512036 | A | 4/2018 |
| JP | 2021093828 | A | 6/2021 |
| JP | 2021129457 | A | 9/2021 |
| JP | 2021164271 | A | 10/2021 |

* cited by examiner

POWER RECEIVING APPARATUS, METHOD FOR POWER RECEIVING APPARATUS, AND STORAGE MEDIUM

CROSS-REFERENCE TO RELATED APPLICATIONS

This application is a Continuation of International Patent Application No. PCT/JP2022/041930, filed Nov. 10, 2022, which claims the benefit of Japanese Patent Application No. 2021-200208, filed Dec. 9, 2021, both of which are hereby incorporated by reference herein in their entireties.

TECHNICAL FIELD

The present disclosure relates to a wireless power transfer technology.

BACKGROUND ART

In recent years, technical development of a wireless power transfer system is widely performed. PTL 1 describes a method for foreign object detection in a Wireless Power Consortium standard (WPC standard). PTL 2 describes a foreign object detection method that detects the presence of an object (hereinafter, referred to as foreign object) different from a power receiving apparatus or a power transmission apparatus in accordance with a change in energy attenuation or a change in resonant frequency of a power transmission coil and a resonant circuit integrated with or coupled to the power transmission coil. PTL 3 describes a foreign object detection method in which a power transmission apparatus transmits a signal for foreign object detection to a power receiving apparatus and determines the presence or absence of a foreign object by using an echo signal from the power receiving apparatus.

CITATION LIST

Patent Literature

PTL 1: Japanese Patent Laid-Open No. 2017-070074
PTL 2: PCT Japanese Translation Patent Publication No. 2018-512036
PTL 3: Japanese Patent Laid-Open No. 2015-027172

In wireless power transfer, when it is determined that a foreign object is present, a power transmission apparatus stops transmission of electric power, so it is possible to reduce the possibility of heat generation or the like of the foreign object due to transmission of electric power to the foreign object. It is assumed that a foreign object detection process is configured to be executed in a manner such that the power transmission apparatus receives a predetermined signal from a power receiving apparatus and the foreign object detection process is executed accordingly. However, depending on the result of the foreign object detection process, there can be a case where it is not clearly shown whether a foreign object is present. In this case, there are problems that the possibility of heat generation or the like of a foreign object increases as a result of continuation of transmission of electric power or transmission of electric power is stopped although no foreign object is present and, as a result, power transmission efficiency decreases.

SUMMARY

The present disclosure is made in view of the above-described task, and it is an object of the present disclosure to further quickly execute a detection process again according to the result of a detection process for detecting an object different from a power transmission apparatus or a power receiving apparatus.

A power receiving apparatus according to the present disclosure wirelessly receives power from a power transmission apparatus, transmits with a predetermined interval a packet including information on a received power in a power transfer phase, receives, from the power transmission apparatus, a response for the transmitted packet, switches to first mode in a case where the received response is a predetermined response, and switches to second mode in a case where the received response is not the predetermined response. The packet including information on the received power is transmitted with a first interval in the first mode and the packet including information on the received power is transmitted with a second interval in the second mode. The first interval is shorter than the second interval. The received power is reduced in a case where the received response is a predetermined response.

Further features of the present disclosure will become apparent from the following description of exemplary embodiments with reference to the attached drawings.

DESCRIPTION OF EMBODIMENTS

First Embodiment

Figure 1:
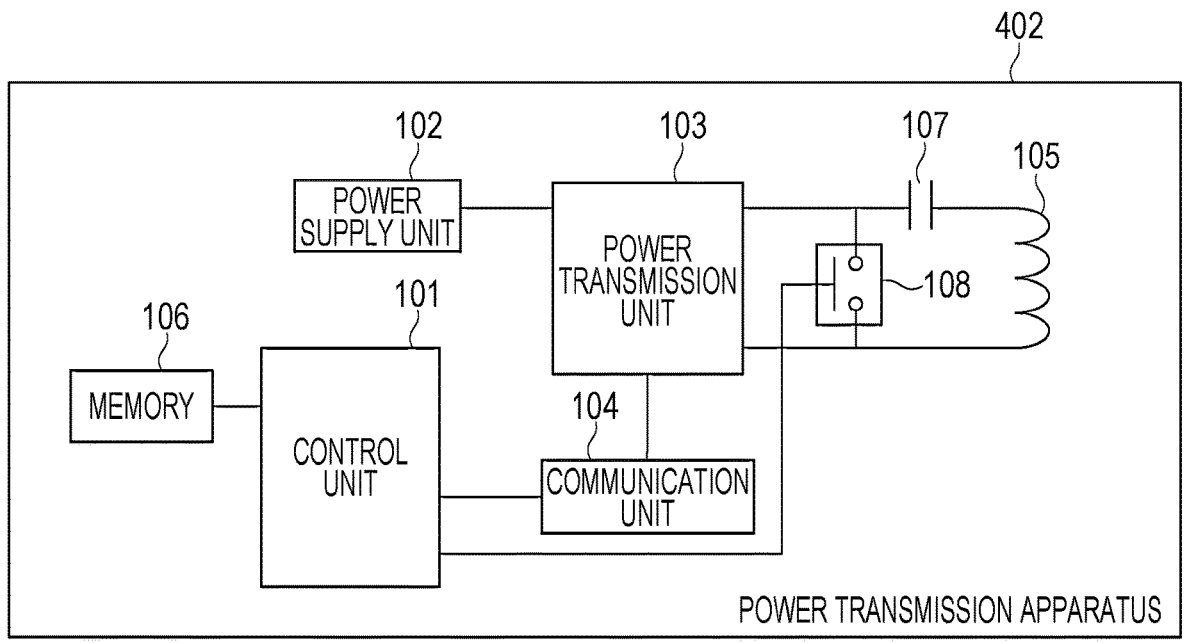
FIG. 1 is a diagram that shows a configuration example of a power transmission apparatus.

Hereinafter, an embodiment will be described with reference to the attached drawings. A plurality of features is described in the embodiment; however, not all the plurality of features is indispensable, and the plurality of features may be used in any combination. In addition, like reference numerals denote the identical or similar components in the attached drawings.

Configuration of Wireless Power Transfer System

Figure 4:
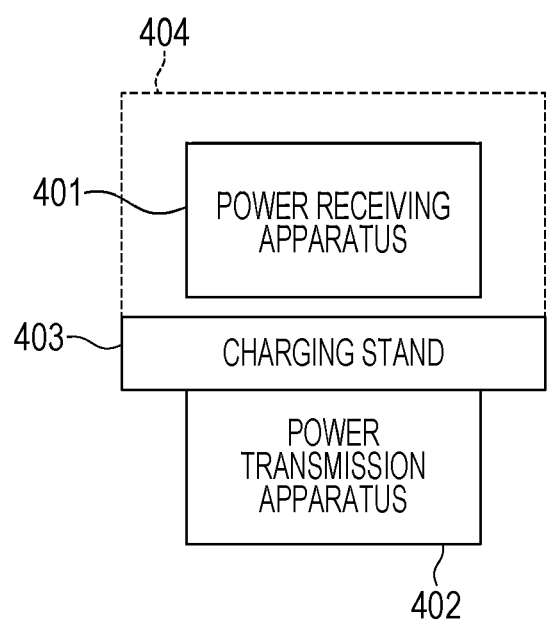
FIG. 4 is a diagram that shows a configuration example of a wireless power transfer system.

FIG. 4 shows a configuration example of a wireless power transfer system (wireless charging system) according to the present embodiment. The system is configured to include a power receiving apparatus 401 and a power transmission apparatus 402 in an example. The detailed configuration of the power receiving apparatus 401 will be described later with reference to FIG. 2, and the detailed configuration of the power transmission apparatus 402 will be described later with reference to FIG. 1. Hereinafter, the power receiving apparatus 401 may be referred to as RX 401, and the power transmission apparatus 402 may be referred to as TX 402. The RX 401 is an electronic device that receives electric power from the TX 402 and charges a built-in battery. The TX 402 is an electronic device that wirelessly transmits electric power to the RX 401 mounted on a charging stand 403 that is part of the TX 402. Hereinafter, since the charging stand 403 is part of the TX 402, the sentence "mounted on the charging stand 403" may be referred to as "mounted on the TX 402 (power transmission apparatus 402)". A range 404 surrounded by the dashed line is a range in which the RX 401 can receive electric power from the TX 402. A "mounted" state assumes that the RX 401 and the TX 402 are not necessarily in contact with each other and includes a state where the RX 401 is contained in the range 404.

Each of the RX 401 and the TX 402 can have a function of executing an application other than wireless charging. An example of the RX 401 is an information processing terminal, such as a smartphone, and an example of the TX 402 is an accessory device for charging the information processing terminal. For example, an information terminal device has a display unit (display) that shows information to a user. The display unit (display) is supplied with electric power received from a power receiving coil (antenna). Electric power received from the power receiving coil is stored in an electrical storage unit (battery), and electric power is supplied from the battery to the display unit. In this case, the RX 401 may have a communication unit that communicates with another apparatus different from the TX 402. The communication unit may support communication standards, such as NFC communication and 5th generation mobile communication system (5G). In this case, the communication unit may perform communication by being supplied with electric power from the battery. The RX 401 may have a function of notifying the remaining amount of the battery. The RX 401 may be a tablet terminal or a storage device, such as a hard disk drive and a memory device, or may be an information processing apparatus, such as a personal computer (PC). The RX 401 may be, for example, an image capture apparatus (a camera, a video camera, or the like). The RX 401 may be an image input device, such as a scanner, or an image output device, such as a printer, a copying machine, and a projector. The RX 401 may be a robot, a medical apparatus, or the like. The TX 402 can be a device for charging the above-described devices.

The TX 402 may be a smartphone. In this case, the RX 401 may be another smartphone or may be a wireless earphone.

The RX 401 in the present embodiment may be a vehicle, such as an automobile. For example, an automobile that is the RX 401 may receive electric power from a charger (TX 402) via a power transmission antenna installed in a parking lot. An automobile that is the RX 401 may receive electric power from a charger (TX 402) via a power transmission coil (antenna) embedded in a road. In such an automobile, received electric power is supplied to the battery. Electric power from the battery may be supplied to an actuation unit (a motor or an electrically driven unit) that drives a wheel, may be used to drive a sensor used to assist in driving, or may be used to drive the communication unit that communicates with an external apparatus. In other words, in this case, the RX 401 may have a communication unit that communicates with not only the wheel but also the battery, the motor and the sensor that are driven by using electric power received, and an apparatus other than the TX 402.

Furthermore, the RX 401 may have an accommodating portion that accommodates a human. Examples of the sensor include a sensor used to measure an inter-vehicle distance and a sensor used to measure a distance to another obstacle. The communication unit may support, for example, the Global Positioning System (Global Positioning Satellites or GPS). The communication unit may support a communication standard, such as 5th generation mobile communication system (5G). The vehicle may be a bicycle or a motorcycle. The RX 401 is not limited to the vehicle. The RX 401 may be a moving object, a flying object, or the like having an actuation unit that is driven by using electric power stored in the battery. The TX 402 may be a charger installed in a console or the like in the vehicle or may be a charging apparatus that charges an electric vehicle. The RX 102 does not need to incorporate a battery.

The RX 401 and the TX 402 in the present embodiment execute a process based on the Wireless Power Consortium standard (WPC standard). The details of the process will be described later.

Configuration of Power Transmission Apparatus 402 and Power Receiving Apparatus 401

Subsequently, the configuration of the power transmission apparatus 402 (TX 402) and the power receiving apparatus 401 (RX 401) in the present embodiment will be described. The components described below are only an example. Part (or all in some cases) of the components described may be replaced with other components that have similar functions or omitted, or an additional component may be added to the components described. Furthermore, one block described in the following description may be divided into a plurality of blocks or a plurality of blocks may be integrated into one block. The functions of the functional blocks described below are implemented as software programs. Alternatively, one or some or all included in the functional blocks may be implemented by hardware.

FIG. 1 is a functional block diagram that shows a configuration example of the TX 402 according to the present embodiment. The TX 402 includes a control unit 101, a power supply unit 102, a power transmission unit 103, a communication unit 104, a power transmission antenna 105, a memory 106, a resonant capacitor 107, and a switch unit 108. In FIG. 1, the control unit 101, the power supply unit 102, the power transmission unit 103, the communication unit 104, and the memory 106 are described as separate units; however, selected some of these functional blocks may be implemented in the same chip.

The control unit 101, for example, controls the overall TX 402 by running the control programs stored in the memory 106. The control unit 101 executes control related to power transmission control including communication for device authentication in the TX 402. Furthermore, the control unit 101 may execute control for executing an application other than wireless power transfer. The control unit 101 is configured to include one or more processors, such as central processing units (CPUs) and microprocessor units (MPUs). The control unit 101 may be made up of hardware, such as an application specific integrated circuit (ASIC). The control unit 101 may be configured to include an array circuit, such as a field programmable gate array (FPGA), compiled so as to execute a predetermined process. The control unit 101 stores information to be stored during execution of various processes in the memory 106. The control unit 101 can measure a time period using a timer (not shown).

The power supply unit 102 supplies electric power to the functional blocks. The power supply unit 102 is, for example, a commercial power supply or a battery. Electric power supplied from the commercial power supply is stored in the battery.

The power transmission unit 103 converts direct-current or alternating-current power input from the power supply unit 102 to alternating-current frequency power in a frequency band used for wireless power transfer and inputs the alternating-current frequency power to the power transmission antenna (coil) 105, thus generating electromagnetic waves for causing the RX 401 to receive electric power. For example, the power transmission unit 103 converts direct-current voltage supplied from the power supply unit 102 to alternating-current voltage with a switching circuit having a half-bridge or full-bridge configuration using field effect transistors (FETs). In this case, the power transmission unit 103 includes a gate driver that controls the on/off states of the FETs.

The power transmission unit 103 controls the intensity of electromagnetic waves to be output, by adjusting voltage (power transmission voltage) or current (power transmission current) input to the power transmission antenna 105 or both. As the power transmission voltage or the power transmission current is increased, the intensity of electromagnetic waves increases; whereas, as the power transmission voltage or the power transmission current decreases, the intensity of electromagnetic waves decreases. The power transmission unit 103 executes output control over alternating-current frequency power in accordance with instructions from the control unit 101 such that transmission of electric power from the power transmission antenna 105 is started or stopped. The power transmission unit 103 is capable of supplying electric power to output an electric power of 15 watts (W) to the charging unit 206 of the power receiving apparatus 401 (RX 401) that supports the WPC standard.

The communication unit 104 performs communication for power transmission control based on the WPC standard with the RX 401. The communication unit 104 performs communication by performing frequency shift keying of electromagnetic waves output from the power transmission antenna 105 and transferring information to the RX 401. The communication unit 104 demodulates the electromagnetic waves transmitted from the power transmission antenna 105 and amplitude modulated or load modulated by the RX 401 and acquires information transmitted from the RX 401. In other words, communication performed by the communication unit 104 is performed in a manner such that a signal is superimposed on electromagnetic waves transmitted from the power transmission antenna 105. The communication unit 104 may communicate with the RX 401 through communication compliant with a standard different from the WPC standard and using an antenna different from the power transmission antenna 105 or may communicate with the RX 401 selectively using a plurality of communications. Examples of the communication standard include Bluetooth (registered trademark) Low Energy (BLE) and NFC (Near Field Communication).

The memory 106 can store not only control programs but also the states of the TX 402 and RX 401 (a transmitting power value, a receiving power value, and the like). For example, the state of the TX 402 can be acquired by the control unit 101, and the state of the RX 401 can be acquired by the control unit 201 of the RX 401 and received via the communication unit 104.

The switch unit 108 is controlled by the control unit 101. When the power transmission antenna 105 is connected to the resonant capacitor 107 and the switch unit 108 is set to an on state, the power transmission antenna 105 and the resonant capacitor 107 make up a series resonant circuit and resonate at a specific frequency f1. At this time, current flows through a closed circuit formed by the power transmission antenna 105, the resonant capacitor 107, and the switch unit 108. When the switch unit 108 is set to an off state and is open, the power transmission antenna 105 and the resonant capacitor 107 are supplied with electric power from the power transmission unit 103.

Figure 2:
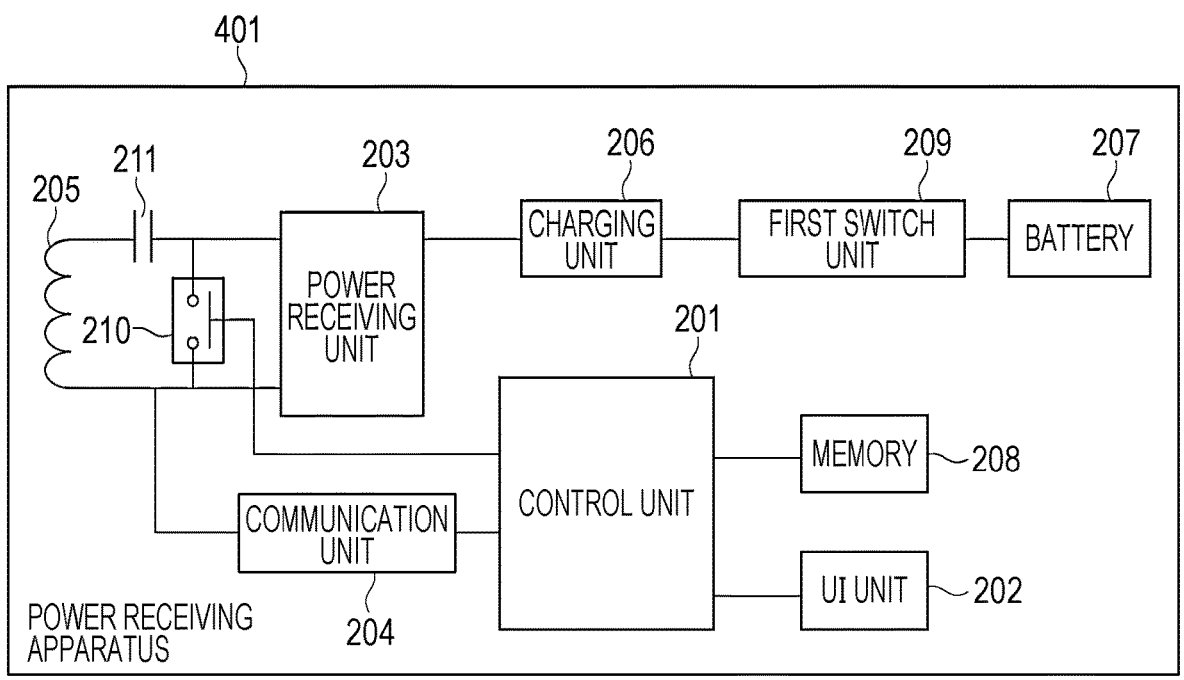
FIG. 2 is a diagram that shows a configuration example of a power receiving apparatus.

FIG. 2 is a block diagram that shows a configuration example of the power receiving apparatus 401 (RX 401) according to the present embodiment. The RX 401 includes a control unit 201, a user interface (UI) unit 202, a power receiving unit 203, a communication unit 204, a power receiving antenna 205, a charging unit 206, a battery 207, a memory 208, a first switch unit 209, a second switch unit 210, and a resonant capacitor 211. A plurality of functional blocks shown in FIG. 2 may be implemented by a single hardware module.

The control unit 201, for example, controls the overall RX 401 by running the control programs stored in the memory 208. In other words, the control unit 201 controls the functional units shown in FIG. 2. Furthermore, the control unit 201 may execute control for executing an application other than wireless power transfer. An example of the control unit 201 is configured to include one or more processors, such as CPUs and MPUs. The overall RX 401 (when the RX 401 is a smartphone, the overall smartphone) may be controlled by cooperation with an operating system (OS) being executed by the control unit 201.

The control unit 201 may be made up of hardware, such as an ASIC. Alternatively, the control unit 201 may be configured to include an array circuit, such as an FPGA, compiled so as to execute a predetermined process. The control unit 201 stores information to be stored during execution of various processes in the memory 208. The control unit 201 can measure a time period using a timer (not shown).

The UI unit 202 performs various outputs for a user. Various outputs here include screen display, a change in blinking or color change of a light emitting diode (LED), voice output through a speaker, a motion, such as vibrations of the main body of the RX 401. The UI unit 202 is implemented by a liquid crystal panel, a speaker, a vibration motor, or the like.

The power receiving unit 203 acquires, via the power receiving antenna (coil) 205, alternating-current power (alternating-current voltage and alternating current) generated by electromagnetic induction based on electromagnetic waves radiated from the power transmission antenna 105 of the TX 402. Then, the power receiving unit 203 converts alternating-current power to direct-current power or alternating-current power with a predetermined frequency and outputs the electric power to the charging unit 206 that executes a process for charging the battery 207. In other words, the power receiving unit 203 includes a rectifier section and a voltage control section needed to supply electric power to a load in the RX 401. The above-described GP is the amount of electric power guaranteed to be output from the power receiving unit 203. The power receiving unit 203 is capable of supplying electric power for the charging unit 206 to charge the battery 207 and supplying electric power to output an electric power of 15 watts to the charging unit 206.

The communication unit 204 performs communication for power receiving control based on the WPC standard with the communication unit 104 of the TX 402. The communication unit 204 acquires information transmitted from the TX 402 and demodulated from electromagnetic waves input from the power receiving antenna 205. Then, the communication unit 204 communicates with the TX 402 by superimposing a signal related to information to be transmitted to the TX 402 over electromagnetic waves through amplitude modulation or load modulation of the input electromagnetic waves. The communication unit 204 may communicate with the TX 402 through communication compliant with a standard different from the WPC standard and using an antenna different from the power receiving antenna 205 or may communicate with the TX 402 selectively using a plurality of communications. Examples of the communication standard include Bluetooth (registered trademark) Low Energy (BLE) and NFC (Near Field Communication).

The memory 208 not only stores the control programs but also stores the states of the TX 402 and RX 401, and the like. For example, the state of the RX 401 can be acquired by the control unit 201, and the state of the TX 402 can be acquired by the control unit 101 of the TX 402 and received via the communication unit 204.

The first switch unit 209 and the second switch unit 210 are controlled by the control unit 201. When the power receiving antenna 205 is connected to the resonant capacitor 211 and the second switch unit 210 is set to an on state to establish a short circuit, the power receiving antenna 205 and the resonant capacitor 211 make up a series resonant circuit and resonates at a specific frequency f2. At this time, current flows through a closed circuit formed by the power receiving antenna 205, the resonant capacitor 211, and the second switch unit 210, and no current flows through the power receiving unit 203. When the second switch unit 210 is set to an off state and is open, electric power received by the power receiving antenna 205 and the resonant capacitor 211 is supplied to the power receiving unit 203.

The first switch unit 209 is used to control whether to supply a received electric power to the battery 207 that is a load. The first switch unit 209 also has a function of controlling the value of the load. When the first switch unit 209 connects the charging unit 206 with the battery 207, received electric power is supplied to the battery 207. When the first switch unit 209 cuts off connection of the charging unit 206 with the battery 207, received electric power is not supplied to the battery 207. In FIG. 2, the first switch unit 209 is disposed between the charging unit 206 and the battery 207. Alternatively, the first switch unit 209 may be disposed between the power receiving unit 203 and the charging unit 206. Alternatively, the first switch unit 209 may be disposed between the power receiving unit 203 and a closed circuit formed by the power receiving antenna 205, the resonant capacitor 211, and the second switch unit 210. In other words, the first switch unit 209 may be used to control whether to supply received electric power to the power receiving unit 203. The first switch unit 209 is shown as one block in FIG. 2. Alternatively, the first switch unit 209 may be implemented as part of the charging unit 206 or part of the power receiving unit 203.

Figure 3:
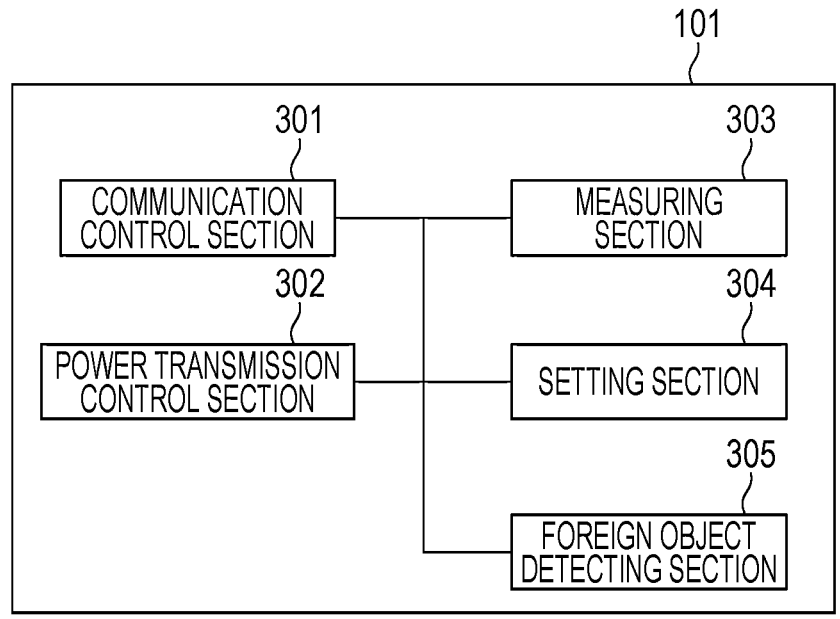
FIG. 3 is a block diagram that shows a functional configuration example of a control unit of the power transmission apparatus.

Next, the functions of the control unit 101 of the TX 402 will be described with reference to FIG. 3. FIG. 3 is a block diagram that shows a functional configuration example of the control unit 101 of the power transmission apparatus 402 (TX 402). The control unit 101 includes a communication control section 301, a power transmission control section 302, a measuring section 303, a setting section 304, and a foreign object detecting section 305.

The communication control section 301 performs controlling communication with the RX 401 based on the WPC standard via the communication unit 104. The power transmission control section 302 controls the power transmission unit 103 and controls transmission of electric power to the RX 401. The measuring section 303 measures a waveform attenuation index (described later). The measuring section 303 measures electric power to be transmitted to the RX 401 via the power transmission unit 103 and measures an average transmitting power for each unit time period. The measuring section 303 measures the quality factor of the power transmission antenna 105. The setting section 304 sets a threshold used for foreign object detection by, for example, a calculation process in accordance with the waveform attenuation index measured by the measuring section 303.

The foreign object detecting section 305 executes a process for detecting a foreign object included in a power transmittable range of the TX 402. Here, a foreign object in the present embodiment means an object different from the power receiving apparatus or the power transmission apparatus. The foreign object detecting section 305 can implement a foreign object detecting function with a Power Loss method (described later), a foreign object detecting function with a quality factor measurement method, and a foreign object detecting function with a waveform attenuation method. The foreign object detecting section 305 may have a function to execute a foreign object detection process by using another technique. For example, in the TX 402 including an NFC (Near Field Communication) function, the foreign object detecting section 305 may execute a foreign object detection process by using an opposing machine detecting function compliant with the NFC standard. The foreign object detecting section 305 is capable of detecting a change in the state on the TX 402 as a function other than detecting a foreign object. For example, the TX 402 is capable of detecting fluctuations in the number of RXs 401 on the TX 402.

The setting section 304 sets a threshold that is a reference for determining the presence or absence of a foreign object when the TX 402 performs foreign object detection with the Power Loss method, the quality factor measurement method, or the waveform attenuation method. The setting section 304 may have a function to set a threshold that is a reference for determining the presence or absence of a foreign object and that is needed to execute a foreign object detection process using another technique. The foreign object detecting section 305 is capable of executing a foreign object detection process in accordance with the threshold set by the setting section 304, and the waveform attenuation index, the transmitting power, and the quality factor measured by the measuring section 303.

The functions of the communication control section 301, the power transmission control section 302, the measuring section 303, the setting section 304, and the foreign object detecting section 305 are implemented as programs that operate in the control unit 101. The processing sections can be configured as programs independent of one another and operate in parallel while taking synchronization among the programs through event handling or the like. However, two or more of these processing sections may be incorporated in one program.

The RX 401 and the TX 402 in the present embodiment perform wireless power transfer using an electromagnetic induction method for wireless charging in compliant with the WPC standard. In other words, the RX 401 and the TX 402 perform wireless power transfer for wireless charging based on the WPC standard between the power receiving antenna 205 of the RX 401 and the power transmission antenna 105 of the TX 402. A wireless power transfer method applied to this system is not limited to a method defined in compliant with the WPC standard and may be another electromagnetic induction method, a magnetic field resonance method, an electric field resonance method, a microwave method, or a method using laser or the like. In the present embodiment, wireless power transfer is used for wireless charging. Wireless power transfer may be performed in uses other than wireless charging.

In the WPC standard, when a power receiving apparatus receives electric power from a power transmission apparatus, the magnitude of electric power guaranteed to be outputtable to a load (battery) of the power receiving apparatus is defined by a value called Guaranteed Power (hereinafter, referred to as "GP"). GP indicates, for example, an electric power value guaranteed to be output to a load (for example, a charging circuit, a battery, or the like) of the RX 401 even when a positional relationship between the RX 401 and the TX 402 fluctuates and, as a result, power transmission efficiency between the power receiving antenna 205 and the power transmission antenna 105 decreases. When, for example, GP is five watts, the TX 402 transmits electric power by executing control such that five watts can be output to the load in the RX 401 even when the positional relationship between the power receiving antenna 205 and the power transmission antenna 105 fluctuates and, as a result power transmission efficiency decreases.

When there is a foreign object that is an object not the RX 401 near the TX 402 at the time of transmitting electric power from the TX 402 to the RX 401, electromagnetic waves for transmission of electric power may influence the foreign object to increase the temperature of the foreign object or break the foreign object. Then, in the WPC standard, a technique for the TX 402 to detect the presence of a foreign object on the charging stand 403 is defined so that, when a foreign object is present, an increase in the temperature of the foreign object and breakage of the foreign object can be prevented by stopping transmission of electric power. Specifically, the Power Loss method that detects a foreign object in accordance with a difference between a transmitting power in the TX 402 and a receiving power in the RX 401 is defined. The quality factor measurement method that detects a foreign object using a change in the quality factor of the power transmission antenna 105 in the TX 402 is defined. A foreign object that the TX 402 in the present embodiment detects is not limited to an object on the charging stand 403. The TX 402 just needs to detect a foreign object located near the TX 402 and, for example, may detect a foreign object located in a range in which the TX 402 can transmit electric power.

Process Based on WPC Standard

The process based on the WPC standard, which is executed by the RX 401 and the TX 402 according to the present embodiment, will be described. In the WPC standard, a plurality of phases including a Power Transfer phase in which power transfer is performed and one or more phases before actual power transfer are defined, and communication for necessary power transmission and receiving control is performed in each phase. The phases before power transfer can include a Selection phase, a Ping phase, an Identification and Configuration phase, a Negotiation phase, and a Calibration phase. Hereinafter, the Identification and Configuration phase is referred to as I&C phase. Hereinafter, the process in each phase will be described.

In the Selection phase, the TX 402 intermittently transmits an Analog Ping and detects that an object is mounted on the charging stand of the TX 402 (for example, the RX 401, a conductor piece, or the like is mounted on the charging stand). The TX 402 detects at least any one of a voltage value and a current value of the power transmission antenna 105 at the time when the TX 402 transmits the Analog Ping, determines that an object is present when the voltage value is lower than a threshold or when the current value exceeds a threshold, and transitions into the Ping phase.

In the Ping phase, the TX 402 transmits a Digital Ping greater in electric power than the Analog Ping. The magnitude of electric power of the Digital Ping is sufficient for the control unit of the RX 401 mounted on the TX 402 to start up. The RX 401 notifies the magnitude of a power receiving voltage to the TX 402. In this way, the TX 402 receives a response from the RX 401 having received the Digital Ping to recognize that the object detected in the Selection phase is the RX 401. When the TX 402 receives notification of the power receiving voltage value, the TX 402 transitions into the I&C phase. Before the TX 402 transmits the Digital Ping, the TX 402 measures the quality factor of the power transmission antenna 105. The measurement result is used when a foreign object detection process using the quality factor measurement method is executed.

In the I&C phase, the TX 402 identifies the RX 401 and acquires device configuration information (capability information) from the RX 401. The RX 401 transmits an ID Packet and a Configuration Packet. The ID Packet contains the identifier information of the RX 401, and the Configuration Packet contains the device configuration information (capability information) of the RX 401. The TX 402 having received the ID Packet and the Configuration Packet returns an acknowledge (ACK or positive acknowledge). Then, the I&C phase ends.

In the Negotiation phase, the value of GP is determined in accordance with the value of GP for which the RX 401 requires, the power transmission capability of the TX 402, and the like. The TX 402 receives an FOD Status Packet containing information of a Reference Quality Factor Value from the RX 401 and adjusts and determines the threshold in the quality factor measurement method. Then, the TX 402 executes a foreign object detection process using the quality factor measurement method in accordance with a request from the RX 401. In the WPC standard, a method of, after once transitioning into the Power Transfer phase, executing a process similar to the Negotiation phase again in response to a request from the RX 401 is defined. A phase in which these processes are executed after transitioning from the Power Transfer phase is referred to as Renegotiation phase.

In the Calibration phase, Calibration is performed in accordance with the WPC standard. The RX 401 notifies a predetermined receiving power value (a receiving power value in a light load state/a receiving power value in a maximum load state) to the TX 402, and the TX 402 performs adjustment for efficiently transmitting electric power. The receiving power value notified to the TX 402 can be used for the foreign object detection process using the Power Loss method.

In the Power Transfer phase, control for start and continuation of transmission of electric power, a stop of transmission of electric power due to an error or full charge, and the like is executed. The TX 402 and the RX 401 use the power transmission antenna 105 and the power receiving antenna 205 to perform communication by superimposing a signal on electromagnetic waves transmitted from the power transmission antenna 105 or the power receiving antenna 205 for the power transmission and receiving control. A range in which communication based on the WPC standard is possible between the TX 402 and the RX 401 is substantially similar to a power transmittable range of the TX 402.

Figure 5:
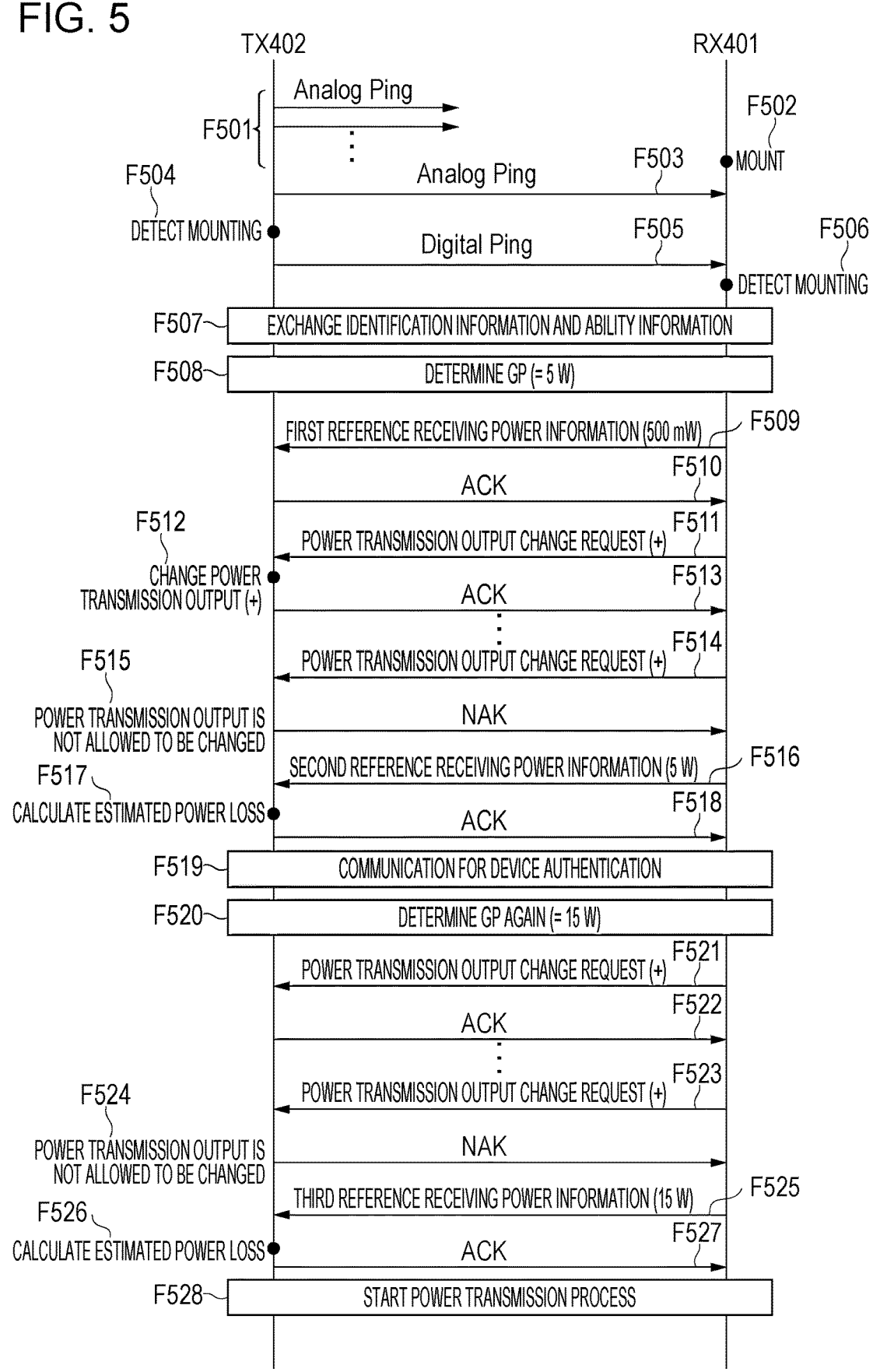
FIG. 5 is a diagram that shows an example of a process for performing wireless power transfer.

The process that the RX 401 and the TX 402 execute in the present embodiment is as described above. Hereinafter, the operations of the RX 401 and the TX 402 in the above-described phases will be described with reference to the sequence diagram of FIG. 5. FIG. 5 is a sequence diagram for power transfer compliant with the WPC standard. Here, the power transmission apparatus 402 (TX 402) and the power receiving apparatus 401 (RX 401) will be described as an example.

The TX 402 repeatedly intermittently transmits a WPC standard Analog Ping to detect an object present in the power transmittable range (F501). The TX 402 executes a process defined as the Selection phase and a process defined as the Ping phase in the WPC standard and waits for the RX 401 to be mounted. A user of the RX 401 brings the RX 401 close to the TX 402 to charge the RX 401 (for example, a smartphone) (F502). The user brings the RX 401 close to the TX 402 by, for example, mounting the RX 401 on the TX 402.

When the TX 402 detects that an object is present in the power transmittable range by using an Analog Ping (F503 and F504), the TX 402 transmits a WPC standard Digital Ping (F505). When the RX 401 receives the Digital Ping, the RX 401 can hold that the TX 402 has detected the RX 401 (F506). When there is a predetermined response to the Digital Ping, the TX 402 determines that the detected object is the RX 401 and the RX 401 is mounted on the charging stand 403. When the TX 402 detects that the RX 401 is mounted, the TX 402 acquires identification information and capability information from the RX 401 by using communication in the I&C phase defined in the WPC standard (F507). Here, the identification information of the RX 401 includes a Manufacturer Code and a Basic Device ID. The capability information of the RX 401 includes the following information. The capability information includes an information element that can identify the supporting version of the WPC standard, a Maximum Power Value that is a value that identifies a maximum electric power that the RX 401 can supply to a load, and information indicating whether a WPC standard Negotiation function is provided. The TX 402 may acquire identification information and capability information of the RX 401 with a method other than communication in the I&C phase of the WPC standard. The identification information may be selected other identification information with which the individual RX 401 can be identified, such as a Wireless Power ID. Information other than the above may be included as the capability information.

Subsequently, the TX 402 determines the value of GP with the RX 401 by communication in the Negotiation phase defined in the WPC standard (F508). In F508, not limited to communication in the Negotiation phase of the WPC standard, another procedure to determine GP may be performed. When the TX 402 acquires in, for example, F507 information indicating that the RX 401 does not support communication in the Negotiation phase, the TX 402 may be configured not to perform communication in the Negotiation phase. In this case, the TX 402 may set the value of GP as a small value (for example, defined in advance in the WPC standard). In the present embodiment, GP=5 watts.

After the TX 402 determines GP, the TX 402 performs Calibration in accordance with GP. In the Calibration process, initially, the RX 401 transmits information (hereinafter, referred to as first reference receiving power information) including a receiving power in a light load state (a load interrupted state or a load state where a transmitting power is lower than or equal to a first threshold) to the TX 402 (F509). The first reference receiving power information in the present embodiment is receiving power information of the RX 401 at the time when the transmitting power of the TX 402 is 250 milliwatts. The first reference receiving power information is a Received Power Packet (mode1) defined in the WPC standard. Alternatively, another message may be used. In the following description, the Received Power Packet (mode1) is also written as "RP1". The TX 402 determines whether to accept the first reference receiving power information in accordance with a power transmission status of the host apparatus. The TX 402 transmits, to the RX 401, a positive acknowledge (ACK) when the TX 402 accepts or a negative acknowledge (NAK) when the TX 402 does not accept.

Subsequently, when the RX 401 receives an ACK from the TX 402 (F510), the RX 401 executes a process for transmitting information (hereinafter, referred to as second reference receiving power information) including a receiving power in a connected load state (a maximum load state or a load state where a transmitting power is higher than or equal to a second threshold) to the TX 402. In the present embodiment, since the GP is five watts, the second reference receiving power information is the receiving power information of the RX 401 at the time when the transmitting power of the TX 402 is five watts. Here, the second reference receiving power information is a Received Power Packet (mode2) defined in the WPC standard. Alternatively, another message may be used. In the following description, the Received Power Packet (mode2) is also written as "RP2". The RX 401 transmits a power transmission output change request including a positive value to increase the transmitting power from the TX 402 to five watts (F511).

The TX 402 receives the above-described power transmission output change request and, when it is possible to increase transmitting power, returns an ACK to increase the transmitting power (F512 and F513). Since the second reference receiving power information is receiving power information at the time when the transmitting power of the TX 402 is five watts, when the TX 402 receives a power increase request to exceed five watts from the RX 401 (F514) and returns an NAK in response to the power transmission output change request. Thus, transmission of electric power greater than or equal to a prescribed value is suppressed (F515).

When the RX 401 determines that the predetermined transmitting power has been reached upon receiving the NAK from the TX 402, the RX 401 transmits, to the TX 402, information including a receiving power in a connected load state as the second reference receiving power information (F516). The TX 402 is allowed to calculate the amount of power loss between the TX 402 and the RX 401 in the load interrupted state and the connected load state in accordance with the transmitting power value of the TX 402 and the receiving power value included in the first reference receiving power information and the second reference receiving power information. By interpolation between those amounts of power loss, it is possible to calculate an estimated value of power loss between the TX 402 and the RX 401 in all the transmitting powers (in this case, between 250 milliwatts to five watts) that can be taken by the TX 402 (F517). The TX 402 transmits an ACK for the second reference receiving power information from the RX 401 (F518) and completes the Calibration process.

When the TX 402 that has determined that a charging process is allowed to be started starts a power transmission process for the RX 401, charging of the RX 401 is started. Before the start of the power transmission process, the TX 402 and the RX 401 execute a device authentication process (F519). When the devices mutually determine that a further higher GP is allowed to be supported, GP may be reset to a further higher value, for example, 15 watts (F520).

In this case, the RX 401 and the TX 402 increase power transmission output by using a power transmission output change request, an ACK, and an NAK to increase the transmitting power of the TX 402 to 15 watts (F521 to F524). Then, the TX 402 and the RX 401 execute a Calibration process again for GP=15 watts. Specifically, the RX 401 transmits information (hereinafter, referred to as third reference receiving power information) including a receiving power in a connected load state of the RX 401 at the time when the transmitting power of the TX 402 is 15 watts (F525). The TX 402 executes Calibration in accordance with the receiving power included in the first reference receiving power information, the second reference receiving power information, and the third reference receiving power information. Thus, the TX 402 is capable of calculating the amount of power loss between the TX 402 and the RX 401 at all the transmitting powers (in this case, 250 milliwatts to 15 watts) that can be taken by the TX 402 (F526). The TX 402 transmits an ACK in response to the third reference receiving power information from the RX 401 (F527) and completes the Calibration process. The TX 402 that has determined that a charging process is allowed to be started starts a power transmission process for the RX 401, and the phase transitions into the Power Transfer phase (F528). The processes from F519 to F527 are not indispensable processes.

In the Power Transfer phase, the TX 402 transmits electric power to the RX 401. A foreign object is detected by using the Power Loss method. In the Power Loss method, initially, the TX 402 calculates the amount of power loss between the TX 402 and the RX 401 in a state of no foreign object from a difference between a transmitting power by the TX 402 and a receiving power by the RX 401 through the above-described Calibration. The calculated value corresponds to a reference amount of power loss in a normal state (a state of no foreign object) during the power transmission process. Then, the TX 402 determines that "a foreign object is present" when the amount of power loss between the TX 402 and the RX 401, measured during transmission of electric power after Calibration deviates by a threshold or above from the amount of power loss in a normal state. The further detailed description of the Power Loss method will be described later.

The Power Loss method is to perform foreign object detection in accordance with a measurement result of power loss during transmission of electric power from the TX 402 to the RX 401. Foreign object detection with the Power Loss method has the drawback of a decrease in the accuracy of foreign object detection when the TX 402 is transmitting a large electric power, while having the advantage of making it possible to keep high power transmission efficiency because foreign object detection can be performed while transmission of electric power is continued.

The flow of the process based on the WPC standard is as described above. In the power transmission process of F528, when transmission of electric power is stopped due to full charge of the battery of the RX 401, detection of a foreign object, or the like, the RX 401 transmits a power transmission stop request command to make a request of the TX 402 to stop transmission of electric power. The power transmission stop request command in the present embodiment is an EPT (End Power Transfer) command (packet). Thus, the power transmission process is ended.

Power Loss Method

Figure 12:
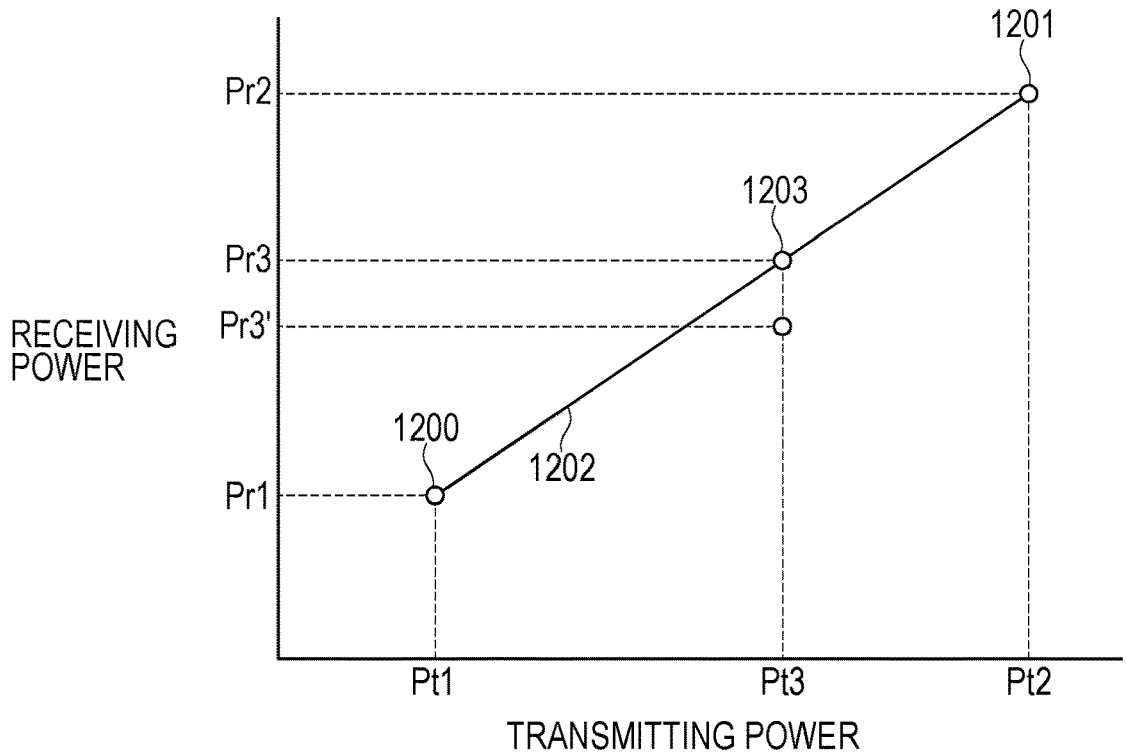
FIG. 12 is a graph for illustrating a method of setting a threshold in foreign object detection with a power loss method.

Foreign object detection based on the Power Loss method defined in the WPC standard will be described with reference to FIG. 12. In FIG. 12, the abscissa axis represents the transmitting power of the TX 402, and the ordinate axis represents the receiving power of the RX 401. A foreign object is an object that can influence transmission of electric power from the TX 402 to the RX 401 and that is other than the RX 401 and can be, for example, an object, such as a metal piece, having electrical conductivity.

Initially, the TX 402 transmits electric power to the RX 401 at a first transmitting power value Pt1. The RX 401 receives electric power at a first receiving power value Pr1 (this state is referred to as a Light Load state (light load state)). Then, the TX 402 stores the first transmitting power value Pt1. Here, the first transmitting power value Pt1 or the first receiving power value Pr1 is a predetermined minimum transmitting power or receiving power. At this time, the RX 401 executes control such that electric power to be received is a minimum electric power. For example, the RX 401 may control the first switch unit 209 to cut off the power receiving antenna 205 from a load (such as a charging circuit and a battery) such that the received electric power is not supplied to the load. Subsequently, the RX 401 notifies an electric power value Pr1 of first receiving power to the TX 402. The TX 402 that has received Pr1 from the RX 401 is capable of calculating a power loss between the TX 402 and the RX 401 as Pt1−Pr1 (Ploss1) and creating a calibration point 1200 indicating a correspondence between Pt1 and Pr1.

Subsequently, the TX 402 changes the transmitting power value to a second transmitting power value Pt2 and transmits electric power to the RX 401. The RX 401 receives electric power at a second receiving power value Pr2 (this state is referred to as a Connected Load state (connected load state)). Then, the TX 402 stores the second transmitting power value Pt2. Here, the second transmitting power value Pt2 or the second receiving power value Pr2 is a predetermined maximum transmitting power or receiving power. At this time, the RX 401 executes control such that electric power to be received is a maximum electric power. For example, the RX 401 controls the first switch unit 209 to connect the power receiving antenna 205 with a load such that the received electric power is supplied to the load. Subsequently, the RX 401 notifies Pr2 to the TX 402. The TX 402 that has received Pr2 from the RX 401 is capable of calculating a power loss between the TX 402 and the RX 401 as Pt2−Pr2 (Ploss2) and creating a calibration point 1001 indicating a correspondence between Pt2 and Pr2.

Then, the TX 402 creates a straight line 1202 for linear interpolation between the calibration point 1200 and the calibration point 1201. The straight line 1202 indicates the relationship between transmitting power and receiving power in a state where no foreign object is present near the TX 402 and the RX 401. The TX 402 is capable of estimating a power value that the RX 401 receives when the TX 402 transmits electric power at a predetermined transmitting power in a state of no foreign object in accordance with the straight line 1202. When, for example, the TX 402 transmits electric power at a third transmitting power value Pt3, a third receiving power value that the RX 401 receives is estimated to be Pr3 from a point 1203 corresponding to Pt3 on the straight line 1202.

As described above, a power loss between the TX 402 and the RX 401 according to a load can be obtained in accordance with a plurality of combinations of the transmitting power value of the TX 402 and the receiving power value of the RX 401, measured while the load is changed. By interpolation from the plurality of combinations, power losses between the TX 402 and the RX 401 according to all the loads can be estimated. In this way, the calibration process that the TX 402 and the RX 401 execute for the TX 402 to acquire combinations of the transmitting power value and the receiving power value is referred to as "Calibration process (CAL process) with the Power Loss method" in the following description.

It is assumed that, after calibration, when the TX 402 actually transmits electric power to the RX 401 at Pt3, and the TX 402 receives a value that is a receiving power value Pr3' from the RX 401. The TX 402 calculates a value Pr3−Pr3' (=Ploss_FO) obtained by subtracting the receiving power value Pr3' actually received from the RX 401 from the receiving power value Pr3 in a state where no foreign object is present. The Ploss_FO can be regarded as a power loss due to electric power consumed by a foreign object when the foreign object is present near the TX 402 and the RX 401. Thus, when the electric power Ploss_FO presumably consumed by a foreign object exceeds a predetermined threshold, it may be determined that a foreign object is present. Alternatively, the TX 402 obtains a power loss Pt3−Pr3 (Ploss3) between the TX 402 and the RX 401 in advance from the receiving power value Pr3 in a state where no foreign object is present. Then, subsequently, from the receiving power value Pr3' received from the RX 401 in a state where a foreign object is present, a power loss Pt3−Pr3' (Ploss3') between the TX 402 and the RX 401 in a state where a foreign object is present is obtained. Then, an electric power Ploss_FO presumably consumed by the foreign object may be estimated by using Ploss3'−Ploss3 (=Ploss_FO).

As described above, an electric power Ploss_FO presumably consumed by a foreign object may be obtained as Pr3−Pr3' (=Ploss_FO) or may be obtained as Ploss3'−Ploss3 (=Ploss_FO). In the following specification, a method of obtaining an electric power Ploss_FO presumably consumed by a foreign object will be basically described as a method of obtaining Ploss3'−Ploss3 (=Ploss_FO). Alternatively, the content of the present embodiment is also applicable to a method of obtaining Pr3−Pr3' (=Ploss_FO). The description of foreign object detection based on the Power Loss method is as described above.

After the straight line 1002 is acquired through the calibration process, the foreign object detecting section 305 of the TX 402 periodically receives the current receiving power value (for example, the above-described Pr3') from the RX 401 via the communication unit 104. A current receiving power value periodically transmitted from the RX 401 is transmitted to the TX 402 as a Received Power Packet (mode0). The foreign object detecting section 305 of the TX 402 detects a foreign object in accordance with the straight line 1002 and the receiving power value stored in the Received Power Packet (mode0).

Hereinafter, the Received Power Packet (mode0) is referred to as "RP0".

Foreign object detection with the Power Loss method is performed during power transfer (transmission of electric power) (Power Transfer phase (described later)) in accordance with data obtained in the Calibration phase (described later). Foreign object detection with the quality factor measurement method is performed before power transfer (before transmission of a Digital Ping (described later), the Negotiation phase, or the Renegotiation phase).

During the Power Transfer phase in the WPC standard, foreign object detection with the Power Loss method is performed. However, with only foreign object detection with the Power Loss method, there is a possibility of erroneous detection of a foreign object or a possibility of erroneous determination that no foreign object is present although a foreign object is present. Particularly, the Power Transfer phase is a phase in which the TX 402 transmits electric power. If a foreign object is present near the TX 402 and the RX 401 during transmission of electric power, heat generation or the like from the foreign object increases, so it is desired to improve foreign object detection accuracy in this phase. Then, in the present embodiment, to improve foreign object detection accuracy, it is considered to perform a foreign object detecting method different from the Power Loss method.

Foreign Object Detecting Method Using Waveform Attenuation Method

Figure 6:
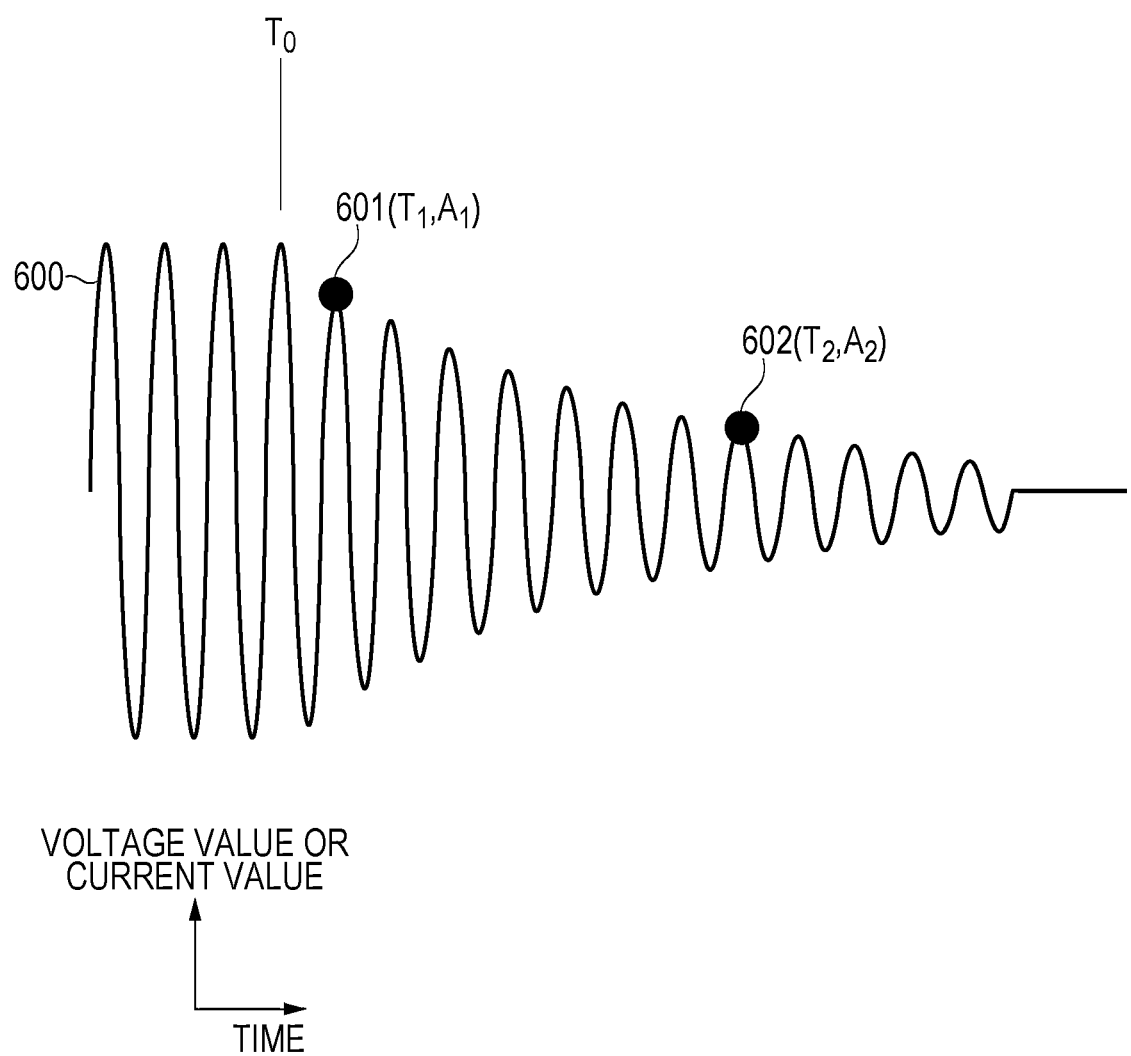
FIG. 6 is a view for illustrating foreign object detection with a waveform attenuation method.

In the Power Transfer phase, the TX 402 is transmitting electric power to the RX 401. Thus, if it is possible to perform foreign object detection using a power transmission waveform (the waveform of voltage or the waveform of current) concerned with the transmission of electric power, foreign object detection is possible without using a newly defined foreign object detection signal or the like. A method of performing foreign object detection based on an attenuation state of a power transmission waveform (hereinafter, referred to as waveform attenuation method) will be described with reference to FIG. 6. FIG. 6 is a view that illustrates the principle of foreign object detection with the waveform attenuation method. Here, foreign object detection using a power transmission waveform associated with transmission of electric power from the TX 402 (TX 402) to the RX 401 (RX 401) will be described as an example.

In FIG. 6, the waveform represents a change in the voltage value 600 of high-frequency voltage (hereinafter, simply referred to as voltage value) applied to the power transmission antenna 105 of the TX 402 with a lapse of time. In FIG. 6, the abscissa axis represents time, and the ordinate axis represents voltage value. The TX 402 transmitting electric power to the RX 401 via the power transmission antenna 105 restricts transmission of electric power at time T0. In other words, at time T0, power supply for transmission of electric power from the power supply unit 102 is restricted. Restricting electric power means stopping electric power or decreasing electric power to a predetermined value or below.

The frequency of power transmission waveform associated with transmission of electric power from the TX 402 is a predetermined frequency and is, for example, a fixed frequency between 85 kHz and 205 kHz used in the WPC standard. A point 601 is a point on an envelope of high-frequency voltage and is a voltage value at time $T_1$. In the graph, $(T_1, A_1)$ indicates that the voltage value at time $T_1$ is $A_1$. Similarly, a point 602 is a point on an envelope of high-frequency voltage and is a voltage value at time $T_2$. In the graph, $(T_2, A_2)$ indicates that the voltage value at time $T_2$ is $A_2$. A quality factor of the power transmission antenna 105 can be obtained in accordance with a temporal change in voltage value from time T0. For example, a quality factor is calculated by using the expression 1 in accordance with time, voltage value, and the frequency f of high-frequency voltage at each of the point 601 and the point 602 on the envelope of voltage value.

$$Q=\pi f(T_2-T_1)/\ln(A_1/A_2) \quad \text{(Expression 1)}$$

When a foreign object is present near the TX 402 and the RX 401, the quality factor decreases. This is because, when a foreign object is present, a loss of energy occurs due to the foreign object. Thus, focusing on the slope of attenuation of voltage value, a loss of energy due to a foreign object occurs more when a foreign object is present than when no foreign object is present, so the slope of a straight line connecting the point 601 with the point 602 becomes steep, and the attenuation factor of the amplitude of waveform increases. In other words, the waveform attenuation method is to determine the presence or absence of a foreign object in accordance with an attenuation state of voltage value between the point 601 and the point 602, and, in actually determining the presence or absence of a foreign object, it is possible to perform determination by comparing a numeric value indicating the attenuation state. For example, determination can be performed by using the above-described quality factor. A decrease in quality factor means that a waveform attenuation factor (the degree of reduction in the amplitude of waveform per unit time) increases. Alternatively, determination may be performed by using the slope of a straight line connecting the point 601 and the point 602. The slope of the straight line is obtained from $(A_1-A_2)/(T_2-T_1)$. Alternatively, if time ($T_1$ and $T_2$) at which the attenuation state of voltage value is observed is fixed, determination may be performed by using $(A_1-A_2)$ indicating a difference in voltage value or the value of a ratio $(A_1/A_2)$ of voltage value. Alternatively, if the voltage value $A_1$ just after transmission of electric power is stopped is constant, determination may be performed by using the value of voltage value $A_2$ after a lapse of a predetermined period of time. Alternatively, determination may be performed by using the value of time $(T_2-T_1)$ until the voltage value $A_1$ becomes a predetermined voltage value $A_2$.

As described above, the presence or absence of a foreign object can be determined in accordance with an attenuation state of a voltage value in a power transmission stop period, and there is a plurality of values indicating the attenuation state. These values indicating the attenuation state are referred to as "waveform attenuation indices" in the present embodiment. For example, as described above, the quality factor calculated by the expression 1 is a value indicating the attenuation state of voltage value associated with transmission of electric power and is included in the "waveform attenuation indices". The waveform attenuation indices all correspond to waveform attenuation factors. In the waveform attenuation method, a waveform attenuation factor itself may be measured as a "waveform attenuation index". Hereinafter, a case where a waveform attenuation factor is used as a waveform attenuation index will be mainly described, and the content of the present embodiment may also be similarly applied to a case where another waveform attenuation index is used.

When the ordinate axis of FIG. 6 represents a current value flowing through the power transmission antenna 105 as well, the attenuation state of current value during a power transmission stop period changes depending on the presence or absence of a foreign object as in the case of voltage value. Then, the waveform attenuation factor in a case where a foreign object is present is higher than the waveform attenuation factor in a case where no foreign object is present. Thus, even when the above-described method is applied in relation to a temporal change in current value flowing through the power transmission antenna 105, a foreign object can be detected. In other words, it is possible to detect a foreign object by determining the presence or absence of a foreign object using a quality factor obtained from a current waveform, the slope of attenuation of current value, a difference in current value, the ratio of current value, the absolute value of current value, a period of time taken until a predetermined current value is reached, or the like as a waveform attenuation index.

Foreign object detection may be performed in accordance with both the attenuation state of voltage value and the attenuation state of current value, for example, by determining the presence or absence of foreign object using an evaluation value calculated from the waveform attenuation index of voltage value and the waveform attenuation index of current value. In the above example, the waveform attenuation index in a period during which the TX 402 temporarily stops transmission of electric power is measured; however, the configuration is not limited thereto. For example, the waveform attenuation index in a period during which the TX 402 temporarily decreases electric power supplied from the power supply unit 102 from a predetermined power level to a power level lower than that may be measured. In the above example, the values of voltage or current at two time points in a period during which the TX 402 restricts transmission of electric power are measured. Alternatively, measurement may be performed at three or more time points.

Figure 7:
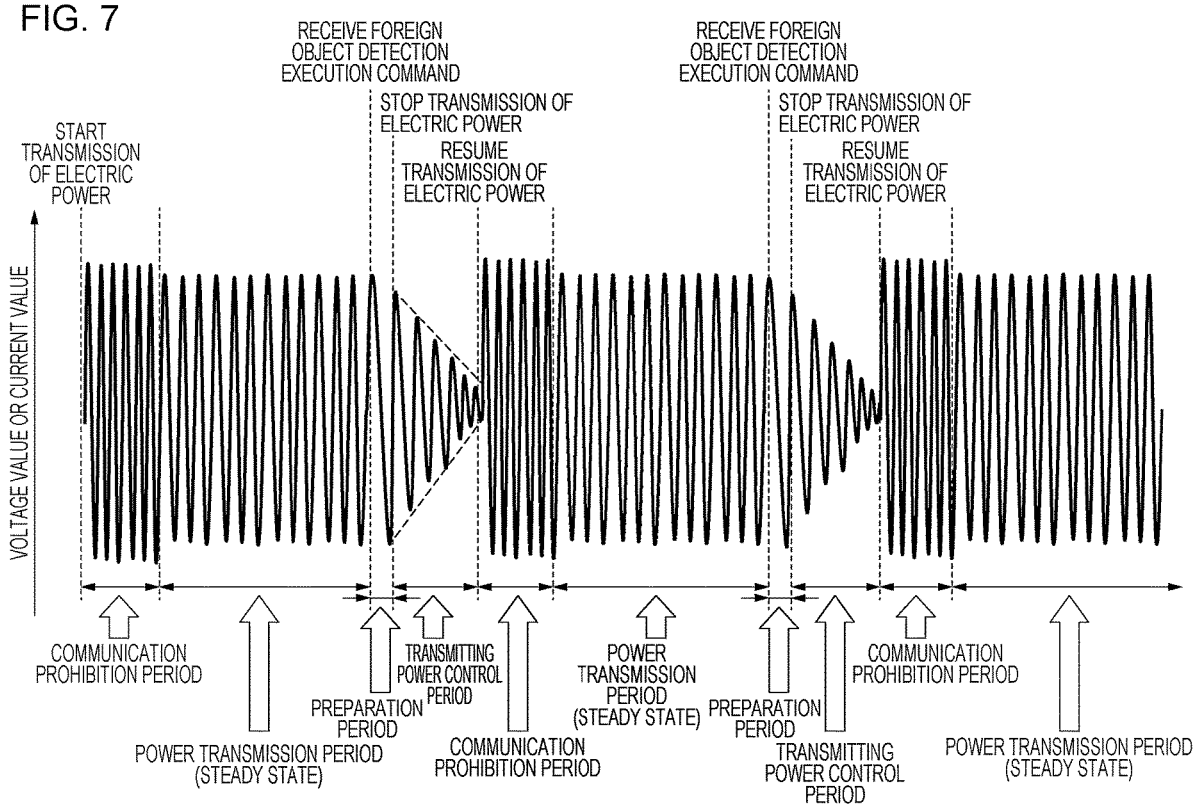
FIG. 7 is a view for illustrating foreign object detection in accordance with a power transmission waveform during transmission of electric power.

A method of performing foreign object detection in accordance with a power transmission waveform during transmission of electric power with the waveform attenuation method will be described with reference to FIG. 7. FIG. 7 shows a power transmission waveform at the time when foreign object detection is performed with the waveform attenuation method. The abscissa axis represents time, and the ordinate axis represents the voltage value of the power transmission antenna 105. As in the case of FIG. 6, the ordinate axis may represent the voltage value of the power transmission antenna 105.

The power transmission waveform is not stable in a transitional response period just after the TX 402 starts transmission of electric power. Thus, during the transitional response period in which the power transmission waveform is not stable, the RX 401 is controlled so as not to perform communication (communication by amplitude modulation or load modulation) with the TX 402. The TX 402 is controlled so as not to perform communication (communication by frequency shift keying) with the RX 401. Hereinafter, this period is referred to as communication prohibition period. During the communication prohibition period, the TX 402 transmits electric power to the RX 401. Then, through the communication prohibition period, the TX 402 transmits electric power to the RX 401. Hereinafter, this period is referred to as power transmission period. When the TX 402 receives a foreign object detection execution request (command) from the RX 401, the TX 402 temporarily stops transmission of electric power after a lapse of a predetermined period. Alternatively, the TX 402 temporarily decreases transmitting power. The predetermined period is referred to as preparation period hereinafter. The foreign object detection execution request may be the above-described Received Power Packet (mode0), Received Power Packet (mode1), or Received Power Packet (mode2). Then, the power transmission control section 302 of the TX 402 stops transmission of electric power or temporarily decreases transmitting power. Then, the amplitude of the power transmission waveform attenuates. A period from when the TX 402 temporarily stops or temporarily decreases transmitting power to when the TX 402 resumes transmission of electric power is, hereinafter, referred to as transmitting power control period. The TX 402 calculates the waveform attenuation index of the attenuation waveform, compares the calculated waveform attenuation index with a predetermined threshold, and determines the presence or absence of a foreign object or a possibility that a foreign object is present (presence probability). Determination may be performed in the transmitting power control period or may be performed in the communication prohibition period or the power transmission period.

After a lapse of the transmitting power control period, when no foreign object is detected, the TX 402 resumes transmission of electric power. A transitional response period just after transmission of electric power is resumed becomes a communication prohibition period again because the power transmission waveform is not stable. Then, the period transitions into the power transmission period in which the TX 402 stably transmits electric power to the RX 401.

As described above, the TX 402 repeatedly performs start of transmission of electric power, the communication prohibition period, the power transmission period, and the transmitting power control period. Then, the TX 402 calculates the waveform attenuation index of the attenuation waveform at predetermined timing, compares the calculated waveform attenuation index with a predetermined threshold, and determines the presence or absence of a foreign object or a possibility that a foreign object is present (presence probability). In other words, in the waveform attenuation method, the presence or absence of a foreign object is determined in accordance with values of voltage or current at least at two time points in a predetermined period in which the TX 402 restricts transmission of electric power. A basic process of foreign object detection with the waveform attenuation method is described above.

If elements, including the power receiving unit 203, the charging unit 206, and the battery 207, are connected to the power receiving antenna 205 and the resonant capacitor 211 of the RX 401 in the transmitting power control period, the waveform attenuation index of the attenuation waveform receives the influence of load due to these elements. In other words, the waveform attenuation index changes depending on the states of the power receiving unit 203, the charging unit 206, and the battery 207. For this reason, even when, for example, the waveform attenuation index is large, it is difficult to differentiate between the influence of a foreign object and the influence of a state change of the power receiving unit 203, the charging unit 206, the battery 207, and the like. Thus, when foreign object detection is performed by observing the waveform attenuation index, the RX 401 may cut off the first switch unit 209 in the preparation period. Thus, it is possible to remove the influence of the battery 207. Alternatively, the second switch unit 210 may be turned on to short-circuit to establish a state where current flows through a closed loop made up of the power receiving antenna 205, the resonant capacitor 211, and the second switch unit 210. Thus, it is possible to remove the influence of the power receiving unit 203, the charging unit 206, and the battery 207. When the RX 401 transmits a foreign object detection execution request (command) to the TX 402, the RX 401 executes the above process. Thus, foreign object detection with high accuracy is possible by performing foreign object detection in accordance with the waveform attenuation index of the waveform observed in a state where the first switch unit 209 or the second switch unit 210 is turned on to short-circuit (establish connection). Alternatively, the RX 401 may execute control to transition into a low power consumption mode or to keep power consumption constant in a state where the first switch unit 209 is turned on to short-circuit and the second switch unit 210 is turned off to be cut off in the preparation period. In other words, when electric power consumed by the RX 401 is not constant or when large electric power is consumed, the waveform attenuation index of the attenuation waveform receives the influence of fluctuations of those power consumptions. Thus, to remove that, the following process can be executed. In other words, electric power consumed by the RX 401 is controlled by, for example, restricting or stopping the operation of a software application that operates on the RX 401, setting a hardware functional block of the RX 401 to a low power consumption mode or an operation stop mode. Foreign object detection with high accuracy is possible by performing foreign object detection in accordance with the waveform attenuation index of the waveform observed in such a state.

Similarly, the TX 402 may also be configured to turn on the switch unit 108 to short-circuit in the preparation period when the TX 402 receives a foreign object detection execution request (command) from the RX 401. In other words, the TX 402 may be set to a state where current flows through a closed loop made up of the power transmission antenna 105, the resonant capacitor 107, and the switch unit 108. Thus, it is possible to remove the influence of the power supply unit 102, the power transmission unit 103, and the communication unit 104. Alternatively, it is possible to remove the influence of the power supply unit 102, the power transmission unit 103, and the communication unit 104 by providing a switch (not shown) between the power transmission antenna and the power transmission unit and cutting off the switch in the preparation period.

Setting Method for Foreign Object Detection Threshold in Waveform Attenuation Method A setting method for a threshold for determining the presence or absence of a foreign object or a possibility of presence (presence probability) of a foreign object at the time of performing foreign object detection with the waveform attenuation method will be described. As described above, in the waveform attenuation method, foreign object detection is performed in accordance with the "waveform attenuation index". The measured "waveform attenuation index" is compared with a predetermined threshold, and the presence or absence of a foreign object or a possibility of presence of a foreign object, is determined in accordance with the result. The following methods can be used as a setting method for the threshold. Initially, the first one is a method in which the TX 402 holds a predetermined value as a threshold that is a common value not dependent on the RX 401 that is a target to which electric power is transmitted. This may be the same value in any case or may be a value that the TX 402 determines according to a situation. As described above, the power transmission waveform during the transmitting power control period has a waveform attenuation factor that increases when a foreign object is present. Thus, a "waveform attenuation index" at the time when it is presumable that "no foreign object is present" is held as a predetermined value in advance, and this value is compared with the result of the measured "waveform attenuation index" as a threshold. When the result is that the measured waveform attenuation index has a greater waveform attenuation factor than the threshold, it is determined that "a foreign object is present" or "there is a high possibility that a foreign object is present". For example, when the "waveform attenuation index" is a quality factor, the TX 402 compares the measured quality factor with a predetermined quality factor (threshold) at the time when no foreign object is present. When the measured quality factor is less than a threshold quality factor, it is determined that "a foreign object is present" or "there is a high possibility that a foreign object is present". When the measured quality factor is greater than or approximately equal to the threshold quality factor, it is determined that "no foreign object is present" or "there is a low possibility that a foreign object is present". With the above configuration, it is possible to perform foreign object detection with the waveform attenuation method using the first method.

The second one is a method in which the TX 402 adjusts and determines a threshold in accordance with information transmitted from the RX 401. As described above, the power transmission waveform during the transmitting power control period has a waveform attenuation factor that increases when a foreign object is present. Thus, a "waveform attenuation index" at the time when it is presumable that "no foreign object is present" is held as a predetermined value in advance, and this value is compared with the result of the measured "waveform attenuation index" as a threshold. When the result is that the measured waveform attenuation index has a greater waveform attenuation factor than the threshold, it is determined that "a foreign object is present" or "there is a high possibility that a foreign object is present". Here, the value of "waveform attenuation index" possibly varies depending on the RX 401 that is a target to which electric power is transmitted and that is mounted on the TX 402. This is because the electric characteristics of the RX 401 coupled via the power transmission coil of the TX 402 influence the value of waveform attenuation index.

For example, when the "waveform attenuation index" is a quality factor, a quality factor measured by the TX 402 at the time when no foreign object is present possibly varies depending on the RX 401 mounted on the TX 402. Thus, the RX 401 holds quality factor information at the time when the RX 401 is mounted on the TX 402 in a state where no foreign object is present for each TX 402 in advance and communicates with the TX 402 to notify the quality factor to the TX 402. Then, the TX 402 adjusts and determines a threshold in accordance with the quality factor information received from the RX 401. More specifically, in the Negotiation phase, the TX 402 receives an FOD Status Packet containing information of a Reference Quality Factor Value and adjusts and determines a threshold in the quality factor measurement method. The Reference Quality Factor Value corresponds to the "quality factor information at the time when the RX 401 is mounted on the TX 402 in a state where no foreign object is present". Thus, the TX 402 also adjusts and determines a threshold in foreign object detection with the waveform attenuation method in accordance with the Reference Quality Factor Value. In the Negotiation phase, a Reference Quality Factor Value transmitted from the RX 401 to the TX 402 is information used for foreign object detection in the quality factor measurement method, which originally measures a quality factor in a frequency domain. However, when the "waveform attenuation index" is a quality factor, it is possible to obtain a quality factor like $Q=\pi f(T_2-T_1)/\ln(A_1/A_2)$ from, for example, the waveform of FIG. 6 also with the waveform attenuation method that measures a quality factor in a time domain although a method of deriving a quality factor is different, so it is possible to set a threshold of a quality factor in the waveform attenuation method in accordance with a Reference Quality Factor Value. In this way, when the TX 402 sets a threshold of a quality factor in the waveform attenuation method in accordance with information already transmitted from the RX 401 to the TX 402 in the Negotiation phase, a process, such as new measurement for setting a threshold, is not needed. As a result, it is possible to set a threshold in a further short period of time.

The TX 402 compares the measured quality factor with the threshold determined in the above method and, when the measured quality factor is less than the threshold quality factor, determines that "a foreign object is present" or "there is a possibility that a foreign object is present". When the measured quality factor is greater than or equal to the threshold quality factor, the TX 402 determines that "no foreign object is present" or "there is a low possibility that a foreign object is present".

With the above configuration, it is possible to perform foreign object detection with the waveform attenuation method using the second method.

The third one is a method in which the TX 402 measures a waveform attenuation index in a state where no foreign object is present and the TX 402 adjusts and determines a threshold in accordance with information of the measured result. The value of "waveform attenuation index" possibly varies depending on the transmitting power of the TX 402. This is because a heat generation amount and various characteristics and the like of the electrical circuit of the TX 402 vary depending on the magnitude of transmitting power of the TX 402 and those influence the value of "waveform attenuation index". Thus, the TX 402 measures a waveform attenuation index for each transmitting power and adjusts and determines a threshold in accordance with the result, thus making it possible to perform foreign object detection with further high accuracy.

Figure 13:
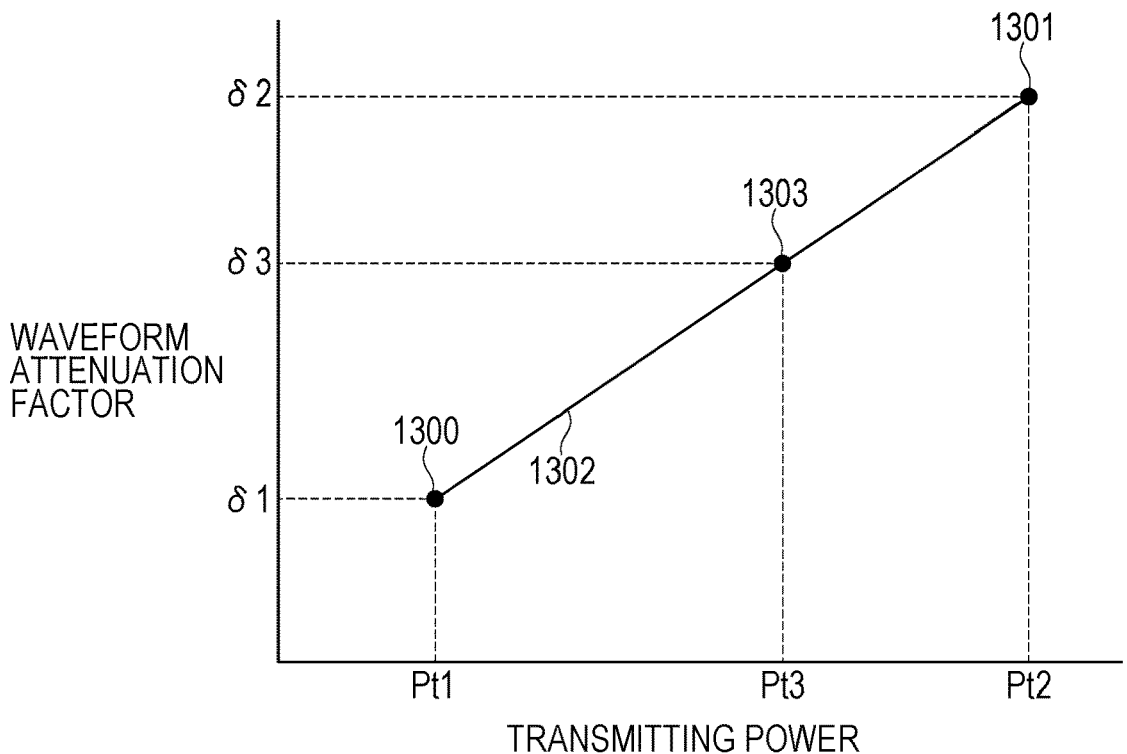
FIG. 13 is a graph for illustrating a method of setting a threshold in foreign object detection with a waveform attenuation method.

FIG. 13 is a graph for illustrating a method of setting a threshold in foreign object detection for each transmitting power of the TX 402 in the waveform attenuation method. Initially, when electric power is transmitted from the TX 402, the RX 401 controls the load on the RX 401 into a light load state such that no electric power is supplied to the load on the RX 401 or only a very small electric power is supplied to the load on the RX 401. The transmitting power of the TX 402 at this time is denoted by Pt1. Then, the TX 402 stops transmission of electric power in that state and measures a waveform attenuation index. The waveform attenuation index at this time is denoted by δ1. At this time, the TX 402 recognizes the transmitting power Pt1 being transmitted by the TX 402 and stores a calibration point 1300 associating the transmitting power Pt1 with the waveform attenuation index δ1 in the memory. Subsequently, when electric power is transmitted from the TX 402, the RX 401 controls the load on the RX 401 into a connected load state such that a maximum electric power is supplied to the load on the RX 401 or an electric power greater than a predetermined threshold is supplied to the load on the RX 401. The transmitting power of the TX 402 at this time is denoted by Pt2. Then, the TX 402 stops transmission of electric power in that state and measures a waveform attenuation index. At this time, the TX 402 stores a calibration point 1301 associating the transmitting power Pt2 with the waveform attenuation index δ2 in the memory. Subsequently, the TX 402 creates a straight line 1302 for linear interpolation between the calibration point 1300 and the calibration point 1301. The straight line 1302 represents the relationship between the transmitting power in a state where no foreign object is present around the TX 402 and the RX 401 and the waveform attenuation index of the power transmission waveform. Thus, the TX 402 is capable of estimating the waveform attenuation index of the power transmission waveform for each transmitting power value in no foreign object state from the straight line 1302. For example, when the transmitting power value is Pt3, it is possible to estimate that the waveform attenuation index is δ3 from a point 1303 on the straight line 1302 corresponding to the transmitting power value Pt3. Then, the TX 402 is capable of calculating a threshold used to determine the presence or absence of a foreign object for each transmitting power value in accordance with the estimated result. For example, a waveform attenuation index greater by a predetermined value (a value corresponding to a measurement error) than an estimated result of the waveform attenuation index in no foreign object state at a transmitting power value may be set for a threshold to determine the presence or absence of a foreign object. A calibration process that the TX 402 and the RX 401 execute for the TX 402 to acquire a combination of a transmitting power value and a waveform attenuation index is referred to as "Calibration process (CAL process) for a waveform attenuation index". In the above-described example, two-point transmitting powers Pt1, Pt2 of the TX 402 are measured. For higher accuracy, the waveform attenuation index of each transmitting power may be calculated by performing measurement at three or more points.

The RX 401 may execute control such that no electric power is supplied to the load or electric power is supplied in a light load state and control to set a connected load state after notifying the TX 402 that the corresponding control is executed. Any one of the two controls may be executed first.

An operation to calculate a threshold used to determine the presence or absence of a foreign object for each load (each transmitting power value), described in the present embodiment, may be executed in the Calibration phase. As described above, in the Calibration phase, the TX 402 acquires data needed at the time of performing foreign object detection with the Power Loss method. At this time, the TX 402 acquires data related to a power loss in a case where the load state of the RX 401 is a light load state and in a case of a connected load state. Measurement of the calibration point 1300 and the calibration point 1301 in FIG. 13 may be performed at the time when the RX 401 comes into a light load state and at the time when the RX 401 comes into a connected load state in the above-described Calibration phase. In other words, when the TX 402 receives first reference receiving power information from the RX 401, the TX 402 measures the calibration point 1300 in addition to a predetermined process to be executed in the Calibration phase. When the TX 402 receives second reference receiving power information from the RX 401, the TX 402 measures the calibration point 1301 in addition to a predetermined process to be executed in the Calibration phase. Thus, it is not necessary to separately provide a period during which measurement of the calibration point 1300 and the calibration point 1301 is performed, so it is possible to measure the calibration point 1300 and the calibration point 1301 in a shorter period of time.

In this way, the TX 402 adjusts and sets a threshold of the waveform attenuation index in the waveform attenuation method of each transmitting power in accordance with information of the waveform attenuation index measured by the TX 402 at each transmitting power. For example, when the waveform attenuation index is a quality factor, the TX 402 compares the measured quality factor with the threshold determined in the above method and, when the measured quality factor is less than the threshold quality factor, determines that "a foreign object is present" or "there is a possibility that a foreign object is present". When the measured quality factor is greater than or equal to the threshold quality factor, the TX 402 determines that "no foreign object is present" or "there is a low possibility that a foreign object is present". With the above configuration, it is possible to set a threshold at each transmitting power of the TX 402, and foreign object detection with further high accuracy is possible.

With the above configuration, it is possible to perform foreign object detection with the waveform attenuation method using the third method.

When foreign object detection is performed, there is a possibility that accurate foreign object detection cannot be performed only by a single execution of a process for performing foreign object detection. For example, when foreign object detection of the waveform attenuation method is performed, there is a possibility that an irregular part appears in the power transmission waveform in the transmitting power control period when transmitting power control is executed once and the presence or absence of a foreign object or a possibility of presence (presence probability) of a foreign object is determined from the waveform attenuation index. Causes conceivable as a possibility that an irregular part appears in the power transmission waveform during the transmitting power control period are that another noise is mixed in the transmitting power control period or that the location of the RX 401 mounted on the TX 402 shifts due to some reasons. Then, the waveform attenuation index obtained from the power transmission waveform during once transmitting power control period cannot be a proper value due to an irregular part of the electrical power transmission waveform and, as a result, erroneous determination can be made in foreign object detection. To prevent such a situation, it is conceivable that transmitting power control is executed multiple times, a waveform attenuation index is measured from a power transmission waveform during a plurality of transmitting power control periods, and foreign object detection is performed from the result.

Foreign Object Detection with Multiple-Time Waveform Attenuation Method

Figure 14:
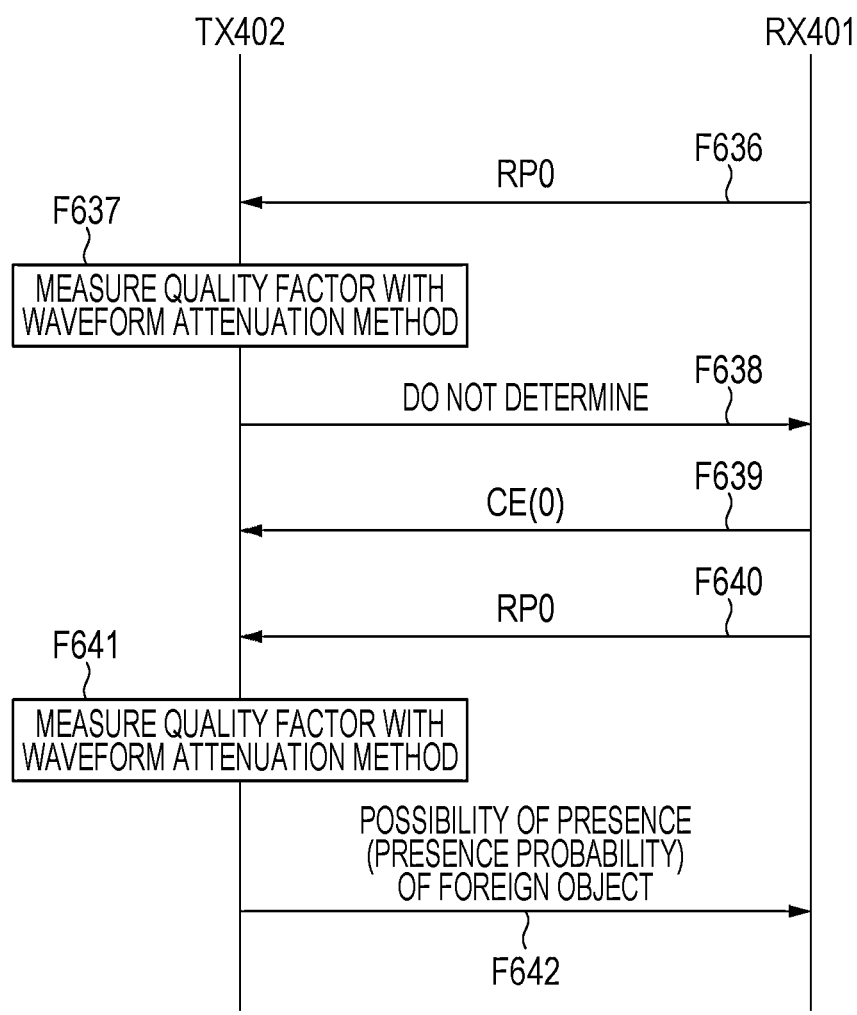
FIG. 14 is a view for illustrating a process in a case where a plurality of waveform attenuation methods is performed.

The above-described waveform attenuation method is configured such that the TX 402 performs quality factor measurement once and executes a foreign object detection process in accordance with the result. Here, the TX 402 can perform quality factor measurement multiple times and execute a foreign object detection process in accordance with the results. A process of performing foreign object detection in accordance with the results of quality factor measurement multiple times will be described with reference to FIG. 14. It is assumed that, in FIG. 14, the TX 402 performs quality factor measurement with the waveform attenuation method twice and performs a foreign object detection process in accordance with the results.

Initially, the RX 401 transmits RP0 to the TX 402 (F636). When the TX 402 receives RP0, quality factor measurement with the waveform attenuation method is performed (F637). Here, it appears that quality factor measurement performed by the TX 402 (F637) is the first one of two. Thus, the TX 402 transmits, to the RX 401, a packet indicating "not to determine" the presence or absence of a foreign object at the present time point as a response to RP0 (F636) (F638).

The RX 401 transmits CE(0) to the TX 402 (F639). Here, CE is an abbreviation of Control Error Packet requesting the TX 402 to increase or decrease a power receiving voltage (a power receiving current or a receiving power). CE can contain a positive integer to increase the power receiving voltage, a negative integer to decrease the power receiving voltage, or zero not to change the power receiving voltage. CE(0) is a packet requesting to maintain the power receiving voltage.

The RX 401 transmits RP0 again (F640). When the TX 402 receives RP0, quality factor measurement with the waveform attenuation method is performed (F641).

Here, it appears that quality factor measurement performed by the TX 402 (F641) is the second one of two. It is assumed that the TX 402 determines that a transmitting power value in the period of $T_{window}$ is stable and there is a possibility of no foreign object through third foreign object detection. In this case, the TX 402 determines the presence or absence of a foreign object and transmits, to the RX 401, a response signal including a possibility of presence (presence probability) of a foreign object in accordance with the determination result (F642).

Here, an example of a method of deriving a possibility of presence (presence probability) of a foreign object with the multiple-time waveform attenuation method will be described. For example, a possibility of presence (presence probability) of a foreign object is derived in accordance with a difference between a quality factor obtained with the single-time waveform attenuation method and a threshold. This process is executed with the multiple-time waveform attenuation method, and an average value of the presence probabilities is derived. Thus, a possibility of presence (presence probability) of a foreign object based on the results of the multiple-time waveform attenuation method is acquired. The second example is a method of assigning weights from a total value of multiple-time possibilities of presence (presence probabilities) of a foreign object. The third one is a method of measuring the number of times of the waveform attenuation method by which the possibility of presence (presence probability) of a foreign object, higher than or equal to a certain value, is detected. In the present embodiment, when the possibility of presence (presence probability) of a foreign object is notified to the RX 401, "no foreign object" is replaced with a numeric value of 0, "a foreign object is present" is replaced with a numeric value of 10, and an average value of the multiple-time values of presence probability is notified to the RX 401. A process of rounding up the decimal places of the average value may be executed.

The RX 401 in the present embodiment controls timing at which the TX 402 restricts transmission of electric power associated with the multiple-time waveform attenuation method, so the RX 401 controls the interval at which RP0 that is a foreign object detection execution request is transmitted. When the RX 401 transmits RP0 as a foreign object detection execution request to the TX 402 multiple times, the RX 401 transmits RP0, then waits for a predetermined interval, and transmits the next RP0. However, when the presence possibility (presence probability) of a foreign object satisfies a predetermined condition, timing to transmit the next RP0 after transmitting RP0 is controlled. This process will be described later.

Process of Power Receiving Apparatus 401 and Power Transmission Apparatus 402

Figure 8:
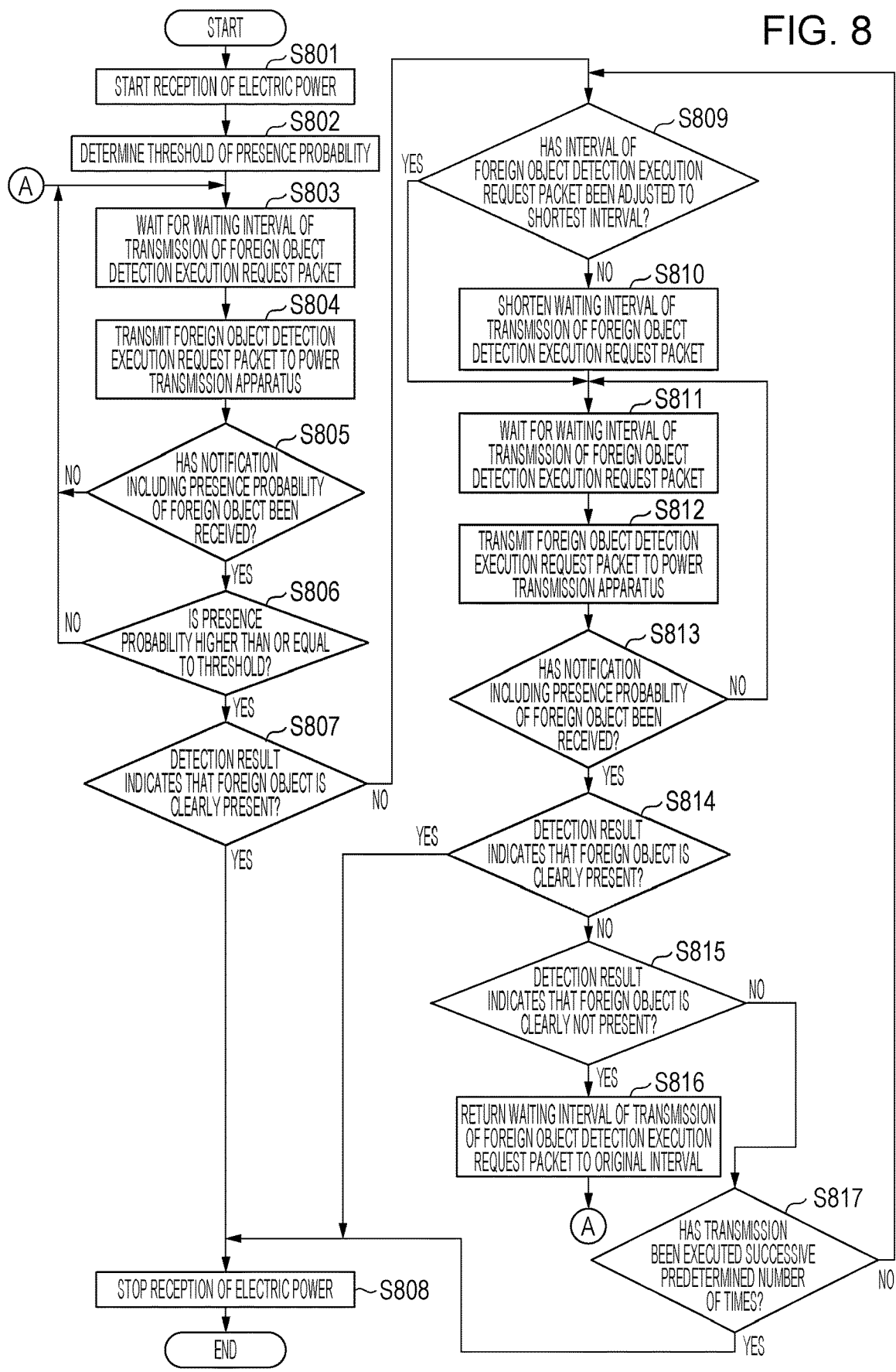
FIG. 8 is a flowchart for illustrating the operation of the power receiving apparatus according to a first embodiment.

The flow of the process of the power receiving apparatus 401 (RX 401) in the present embodiment will be described with reference to the flowchart of FIG. 8. FIG. 8 is a flowchart that shows the operation of the RX 401, executed after the start of the power transmission process of F528 in FIG. 5.

The RX 401 starts reception of electric power transmitted from the TX 402 (S801). The RX 401 that has started reception of electric power determines a presence probability threshold (S802). Here, the presence probability threshold is a threshold to determine whether there is a possibility that a foreign object is present. For example, when the presence probability obtained through the foreign object detection process is greater than the presence probability threshold, it is determined that "there is a high possibility that a foreign object is present". For example, when the presence probability obtained through the foreign object detection process is less than the presence probability threshold, it is determined that "there is a low possibility that a foreign object is present". The presence probability threshold is a value to determine whether to adjust the interval at which the RX 401 (described later) waits for transmission of a foreign object detection execution request. A method of determining the presence probability threshold may be a method of using a value determined for each RX 401 in advance or a method of using a value determined according to a power transmission output from the TX 402.

The RX 401 waits for a predetermined interval to transmit a foreign object detection execution request to the TX 402 (S803). Since the TX 402 in the present embodiment performs foreign object detection based on the multiple-time waveform attenuation method, the RX 401 waits for a predetermined interval (predetermined time length) from when a foreign object detection execution request is transmitted to when the next foreign object detection execution request is transmitted, as described above. When the predetermined interval here is a short interval, transmitting power control is executed in the TX 402 in a short period, and a load is exerted on the RX 401 due to an increase in a process related to a foreign object detection execution request, so a waiting time is desirably set to a longer time. After waiting for the predetermined interval of S803, the RX 401 transmits a foreign object detection execution request to the TX 402 (S804). The foreign object detection execution request may be the above-described Received Power Packet (mode0), or Received Power Packet (mode1), or Received Power Packet (mode2). After transmission of a foreign object detection execution request of S804, the RX 401 determines whether the response packet from the TX 402 contains a possibility of presence (presence probability) of a foreign object (S805). The determination of S805 corresponds to the process of obtaining a possibility of presence (presence probability) of a foreign object from transmitting power control a predetermined multiple number of times, and, when the number of times of transmitting power control has not reached the predetermined number of times, the response from the TX 402 does not contain a presence probability of a foreign object. This is implemented by the TX 402 transmitting an ND (Not-Defined) packet indicating that "not to determine" to the RX 401 as a response. The RX 401 determines whether a predetermined number of times of transmitting power control has been completed in accordance with the ND packet. When there is an ND packet, the RX 401 determines that the predetermined number of times of transmitting power control has not been completed (NO in S805), the process returns to S803, and the RX 401 waits for a predetermined interval to transmit a foreign object detection execution request again. When the response from the TX 402 contains a possibility of presence (presence probability) of a foreign object (YES in S805), the RX 401 determines whether the notified possibility of presence (presence probability) of a foreign object is higher than or equal to a presence probability threshold (S806). When the presence probability is not higher than or equal to the presence probability threshold (NO in S806), the process returns to S803, and waits for a predetermined interval at which a foreign object detection execution request is transmitted again.

When the presence probability is higher than or equal to the threshold (YES in S806), the RX 401 determines whether the notified possibility of presence (presence probability) of a foreign object clearly indicates that "a foreign object is present" (S807). In the present embodiment, as a way of indicating the presence probability, "no foreign object is present" is indicated by zero, and "a foreign object is present" is indicated by 10. Therefore, when the value of the presence probability is 10, it is clearly determined that "a foreign object is present"; when the value of the presence probability is not 10, it is not clearly determined that "a foreign object is present". Not limited to this configuration, for example, eight may be set as a threshold used to clearly determine that "a foreign object is present". In this case, when the value of the presence probability is greater than eight, it is clearly determined that "a foreign object is present"; when the value of the presence probability is less than or equal to eight or less than eight, it is not clearly determined that "a foreign object is present". The threshold to clearly determine whether "a foreign object is present" at this time is a threshold greater than the presence probability threshold. The way of indicating the presence probability is also not limited to the above configuration, and a value or a range other than zero to 10 may be used.

As a result of the determination, when it is clear that "a foreign object is present" (YES in S807), the RX 401 stops reception of electric power. (S808). S808 is implemented by the RX 401 transmitting an EPT (End Power Transfer) command (packet) that is a power transmission stop request command requesting the TX 402 to stop transmission of electric power.

As a result of the determination of S807, when it is not clearly determined that "a foreign object is present", the RX 401 determines a current waiting interval to adjust the waiting interval at which a foreign object detection execution request is transmitted (S809). Specifically, the RX 401 determines whether the time length of a waiting time until the next foreign object detection execution request is transmitted can be made shorter than the current time length. When the waiting time to transmit a foreign object detection execution request is not the shortest time length that can be implemented by the RX 401 (NO in S809), the RX 401 shortens the waiting time until transmission of a foreign object detection execution request (S810) and holds transmission of a foreign object detection execution request until the shortened period of time elapses (S811). On the other hand, when the waiting time to transmit a foreign object detection execution request is already the shortest time length (YES in S809), the RX 401 does not shorten the waiting time to transmit a foreign object detection execution request and holds transmission of a foreign object detection execution request until the current waiting time elapses (S811).

A method of determining a predetermined interval (the time length of waiting time) to transmit a foreign object detection execution request may be a method using a value determined for each of at least any one of the RX 401 and the TX 402 in advance. For example, a method of determining a predetermined interval (the time length of waiting time) may be a method using a value determined according to a power transmission output from the TX 402. The shortest time length may be determined in accordance with, for example, a shortest time length during which the TX 402 can execute the waveform attenuation method or a shortest time length during which the RX 401 can transmit a foreign object detection execution request. For example, the predetermined interval may be determined by negotiation between the RX 401 and the TX 402. This negotiation may be configured to be performed in the Negotiation phase.

A way of shortening the time length can be a method of shortening only a predetermined time length, a method of shortening to the shortest time length through a process once, a method of shortening only a time length according to a power transmission output from the TX 402, or the like.

The process of S811 to S813 is similar to the process of S803 to S805, so the description is omitted. When the response from the TX 402 contains a possibility of presence (presence probability) of a foreign object (YES in S813), the RX 401 determines whether the notified possibility of presence (presence probability) of a foreign object clearly indicates that "a foreign object is present" (S814). As a result of the determination, when it is clear that "a foreign object is present" (YES in S814), the RX 401 stops reception of electric power (S808).

On the other hand, as a result of the determination, when it is not clear that "a foreign object is present" (NO in S814), the RX 401 determines whether it is clear that "no foreign object is present" (S815). Here, a state where it is clear that "no foreign object is present" is a case where the value of presence probability is zero. When it is clear that "no foreign object is present" (YES in S815), the RX 401 returns the shortened time length of waiting time to transmit a foreign object detection execution request to a time length before being shortened and returns to S803 to continue reception of electric power (S816). On the other hand, when it is not clear that "no foreign object is present" (NO in S815), the RX 401 determines whether transmission of a foreign object detection execution request of which the waiting time to transmit a foreign object detection execution request is shortened has been performed a predetermined number of times successively (S817). When transmission of a foreign object detection execution request has been performed the predetermined number of times successively (YES in S817), there is a possibility that failure or the like of a device is suspected, so the RX 401 stops reception of electric power (S808).

When transmission of a foreign object detection execution request has not been performed the predetermined number of times successively (NO in S817), the process returns to S809, and the RX 401 determines the current waiting interval to adjust the time length of waiting time to transmit a foreign object detection execution request. Here, a method of determining a predetermined number of times can be a method using a value determined for each RX 401 in advance, a method using a value determined according to a power transmission output from the TX 402, or the like.

As described above, when the possibility of presence (presence probability) of a foreign object is higher than the presence probability threshold and is lower than the threshold for clearly determining that "a foreign object is present", the RX 401 executes control such that a foreign object detection execution request is transmitted in a shorter interval.

The RX 401 may be configured to not perform the determination of S807 and, when the presence probability is higher than or equal to the threshold in S806, execute the process from S809. With this configuration, when the presence probability is higher than or equal to the threshold, transmission of a foreign object detection execution request is advanced to perform foreign object detection again. Thus, it is possible to quickly and reliably check the presence or absence of a foreign object.

Figure 9:
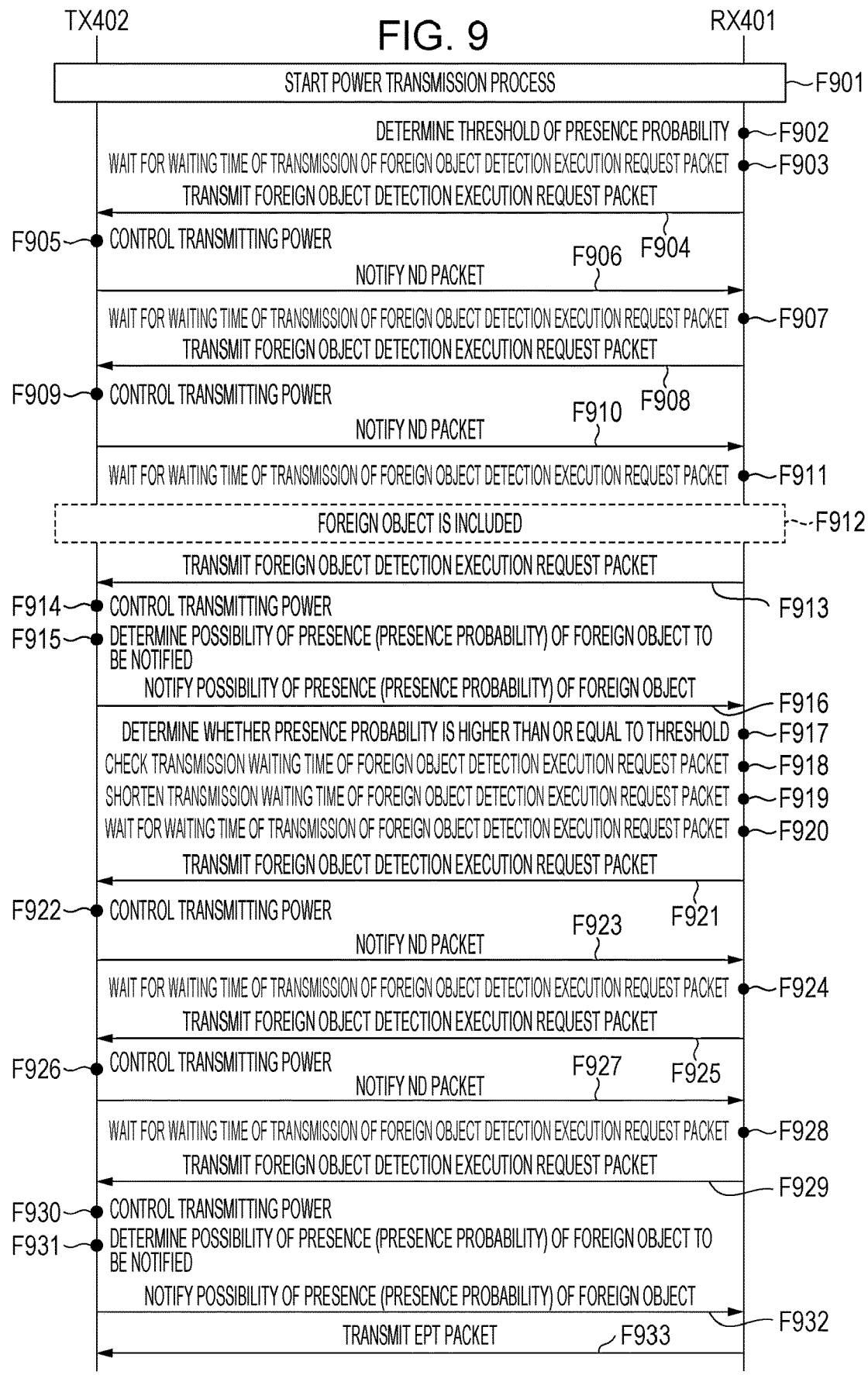
FIG. 9 is a view for illustrating the operation of the power receiving apparatus and the operation of the power transmission apparatus according to the first embodiment.

Next, the flow of the process in the present embodiment of the power receiving apparatus 401 (RX 401) and the power transmission apparatus 402 (TX 402) will be described with reference to the sequence diagram of FIG. 9. FIG. 9 is a process that is executed after the start of the power transmission process of F528 in FIG. 5. Here, as an example of the process, a process at the time when there occurs an inclusion of a foreign object during transmitting power control in the waveform attenuation method at the time when the TX 402 performs the waveform attenuation method three times will be described.

The TX 402 and the RX 401 start a power transmission process (F901). The RX 401 that has started reception of electric power determines a presence probability threshold (F902). Here, on the assumption that transmission of an electric power of 15 watts determined in F527 is being performed, the RX 401 that has determined that the receiving power is high determines a threshold such that a time length to hold transmission of a foreign object detection execution request also in a case where "there is a low possibility that a foreign object is present".

In F902, the RX 401 that has determined the threshold waits for a waiting interval to transmit a foreign object detection execution request (F903). Here, two seconds is set for a waiting time as a prescribed value for the RX 401. A shortest waiting time to transmit a foreign object detection execution request is 0.5 seconds. After the waiting time of F903 elapses, the RX 401 transmits a foreign object detection execution request to the TX 402 (F904). The TX 402 that has received the foreign object detection execution request of F904 from the RX 401 executes transmitting power control and performs detection of a foreign object (F905). Here, three times is a predetermined number of times of transmitting power control, which the TX 402 uses to detect a possibility of presence (presence probability) of a foreign object.

In transmitting power control of F905, no foreign object is present, so the possibility of presence (presence probability) of a foreign object is clearly determined that "no foreign object is present". In transmitting power control of F905, the predetermined number of times of transmitting power control has not been reached, so the TX 402 notifies an ND packet to the RX 401 (F906). The RX 401 that has received the notification of F906 holds transmission of the next foreign object detection execution request until the waiting time elapses (F907). The process of F908 to F911 is similar to the process of F904 to F907, so the description is omitted.

Here, it is assumed that, during waiting of F911, a foreign object is included in the power transmittable range of the TX 402 (F912). After a lapse of the waiting time of F911, the RX 401 transmits a foreign object detection execution request to the TX 402 (F913). The TX 402 that has received the foreign object detection execution request of F913 from the RX 401 executes transmitting power control and performs detection of a foreign object (F914). In transmitting power control of F914, a foreign object is present, so the possibility of presence (presence probability) of a foreign object is clearly determined that "a foreign object is present".

In transmitting power control of F914, the predetermined number of times (=3) of the waveform attenuation method has been reached, so the TX 402 determines the possibility of presence (presence probability) of a foreign object, to be notified to the RX 401, from the results of transmitting power control of F905, F909, and F914 (F915). The TX 402 notifies the possibility of presence (presence probability) of a foreign object, determined in F915, to the RX 401 (F916). The RX 401 that has received the notification of F916 determines whether the notified possibility of presence (presence probability) of a foreign object is higher than or equal to the presence probability threshold determined in F902 (F917). Here, the RX 401 compares the notified possibility of presence (presence probability) of a foreign object with the threshold and determines that the presence probability is higher than or equal to the threshold.

From the result of the determination of F917, the RX 401 checks the current waiting time to transmit a foreign object detection execution request for the process of shortening the waiting time to transmit a foreign object detection execution request (F918). As a result of F918, the current waiting time to transmit a foreign object detection execution request is two seconds and is longer than 0.5 seconds that is the shortest waiting time to transmit a foreign object detection execution request, so the RX 401 shortens the waiting time of the foreign object detection execution request (F919). Here, the RX 401 determines 0.5 seconds that is the shortest waiting time as a waiting time. In the present embodiment, the waiting time is changed to the shortest value through one operation of shortening. Alternatively, the waiting time may be configured to be gradually shortened.

The RX 401 waits for the waiting time to transmit a foreign object detection execution request, determined in F919 (F920). After a lapse of the waiting time shortened in F920, the RX 401 transmits a foreign object detection execution request to the TX 402 (F921). Thus, when the possibility of presence (presence probability) of a foreign object in foreign object detection is higher than the threshold and it is not clearly determined that "a foreign object is present", the TX 402 receives the next foreign object detection execution request at timing earlier than that when these are not satisfied. The TX 402 that has received the foreign object detection execution request transmitted in F921 executes transmitting power control and performs detection of a foreign object (F922). Here, three times as in the case of F905 is a predetermined number of times of transmitting power control, which the TX 402 uses to detect a possibility of presence (presence probability) of a foreign object.

In transmitting power control of F922, a foreign object is present, so the possibility of presence (presence probability)

of a foreign object is clearly determined that "a foreign object is present". In transmitting power control of F922, the predetermined number of times of transmitting power control has not been reached, so the TX 402 notifies an ND packet to the RX 401 (F923). The RX 401 that has received the notification of F923 waits for the waiting time to transmit a foreign object detection execution request again (F924). The process of F925 to F930 is similar to the process of F921 to F926, so the description is omitted.

In transmitting power control of F930, the predetermined number of times of transmitting power control has been reached, so the TX 402 determines the possibility of presence (presence probability) of a foreign object, to be notified to the RX 401, from the results of transmitting power control of F922, F926, and F930 (F931). Here, the TX 402 determines to notify the presence probability indicating that "a foreign object is present" from the result "a foreign object is present" in F922, the result "a foreign object is present" in F926, or the result "a foreign object is present" in F930. The TX 402 notifies the possibility of presence (presence probability) of a foreign object, determined in F931, to the RX 401 (F932). The RX 401 that has received the notification of F932 checks that the notified possibility of presence (presence probability) of a foreign object is that "a foreign object is present", transmits an EPT (End Power Transfer) command (packet) to the TX 402, and stops reception of electric power (F933). The above process is an example of the process in a case where a foreign object is included in foreign object detection based on a plurality of waveform attenuation methods.

In the present embodiment, there are two intervals to hold transmission of a foreign object detection execution request to be adjusted, that is, "an interval to when initial foreign object detection is performed" typically in F903 and "an interval between multiple times of transmitting power control" typically in F907. In the present embodiment, a method of adjusting both at the same time has been described. Alternatively, a method of adjusting only one of both may be applied.

With the above configuration, when the fact that "there is a high possibility that a foreign object is present" is notified from the TX 402, the RX 401 can shorten the transmission interval of a foreign object detection execution request. Thus, when there is a high possibility that a foreign object is present, the RX 401 can shorten a period of time until a foreign object detection process is executed again. As a result, the RX 401 is capable of early clarifying the presence or absence of a foreign object. When the RX 401 is notified of a no foreign object state and it is clear that "no foreign object is present", the RX 401 sets the transmission time of a foreign object detection execution request to a time length longer than the shortest time length. Thus, it is possible to implement a wireless power transfer system that reduces a processing load associated with a waveform attenuation method and that is more safe and highly efficient.

Second Embodiment

In the first embodiment, an example in which foreign object detection with the multiple-time waveform attenuation method is applied in the WPC standard has been described. In the present embodiment, a method in which power transfer is performed with higher safety while the method described in the first embodiment is being used will be described.

Process of Power Transmission Apparatus 402 and Power Receiving Apparatus 401

Figure 10:
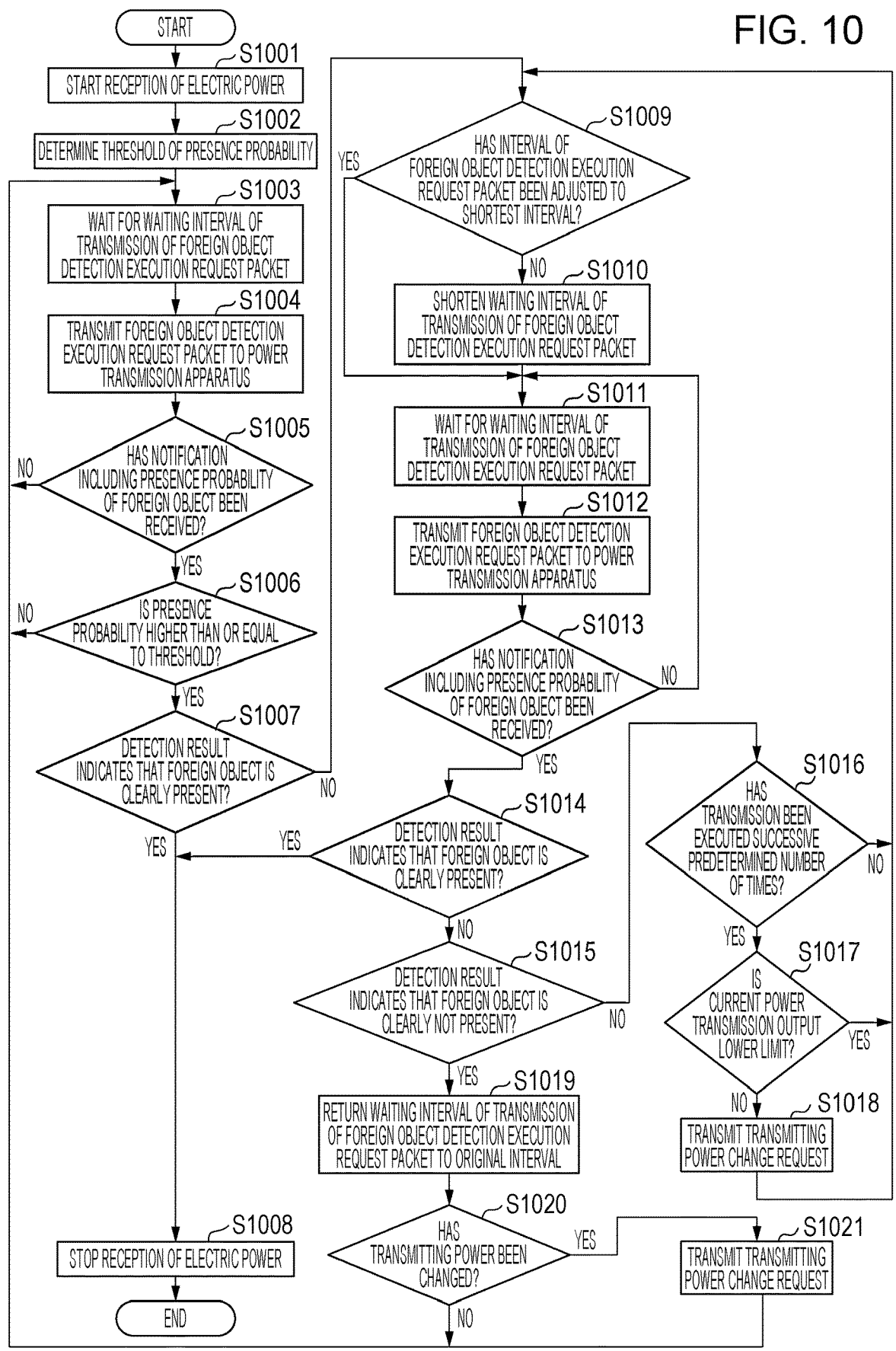
FIG. 10 is a flowchart for illustrating the operation of the power receiving apparatus according to a second embodiment.

The flow of the process of the power receiving apparatus 401 (RX 401) in the present embodiment will be described with reference to the flowchart of FIG. 10. FIG. 10 is a flowchart that shows the operation of the RX 401, executed after the start of the power transmission process of F528 in FIG. 5. The description of process details similar to those of the first embodiment is omitted.

The process of S1001 to S1015 is similar to the process of S801 to S815, so the description is omitted. When it is not clear that "no foreign object is present" (NO in S1015), the RX 401 determines whether transmission of a foreign object detection execution request of which the waiting time to transmit a foreign object detection execution request is shortened has been performed a predetermined number of times successively (S1016). When transmission of a foreign object detection execution request has not been performed a predetermined number of times successively (NO in S1016), the process returns to S1009, and the RX 401 determines the current waiting time to adjust the waiting time to transmit a foreign object detection execution request. A method of determining the predetermined number of times is similar to that of the first embodiment.

On the other hand, when transmission of a foreign object detection execution request has been performed a predetermined number of times successively (YES in S1016), the RX 401 determines whether the current transmitting power from the TX 402 is a lower limit value that can be taken between the TX 402 and the RX 401 (S1017). When the transmitting power from the TX 402 is the lower limit value (YES in S1017), the process returns to S1009, and the RX 401 determines the current waiting time to adjust the waiting time to transmit a foreign object detection execution request. When the transmitting power from the TX 402 is not the lower limit value (NO in S1017), the RX 401 transmits a transmitting power change request to the TX 402 such that the transmitting power is decreased (S1018).

After completion of the transmitting power change process of S1018, the process returns to S1009, the RX 401 determines the current waiting time to adjust the waiting time to transmit a foreign object detection execution request.

When it is clearly determined in S1015 that "no foreign object is present" (YES in S1015), the RX 401 returns the shortened waiting time to transmit a foreign object detection execution request to the time length before the waiting time is shortened (S1019), and determines whether the transmitting power of S1018 has been changed (S1020). When the power transmission output has not been changed (NO in S1020), the process returns to S1003, and the RX 401 continues to receive electric power. On the other hand, when the transmitting power has been changed (YES in S1020), the RX 401 transmits a power transmission output change request to the TX 402 such that the changed transmitting power is returned to the transmitting power before being changed (S1021), the process returns to S803, and the RX 401 continues to receive electric power.

Through the above-described process, the following advantages are obtained. In other words, when there is a high possibility that a foreign object is present, it is possible to avoid risk, such as an increase in the temperature of the foreign object due to transmission of electric power to the foreign object, by decreasing the transmitting power. As the transmitting power increases, the influence of noise associated with transmission of electric power can increase. For this reason, when foreign object detection with the waveform attenuation method is performed, there is a high possibility that erroneous detection of a foreign object occurs, that is, it is determined that "a foreign object is present" although no foreign object is present or it is determined that "no foreign object is present" although a foreign object is present. Therefore, when it is determined that "there is a high possibility that a foreign object is present", foreign object detection is performed again by decreasing the transmitting power, with the result that it is possible to check the presence or absence of a foreign object in a state of further high accuracy.

Figure 11:
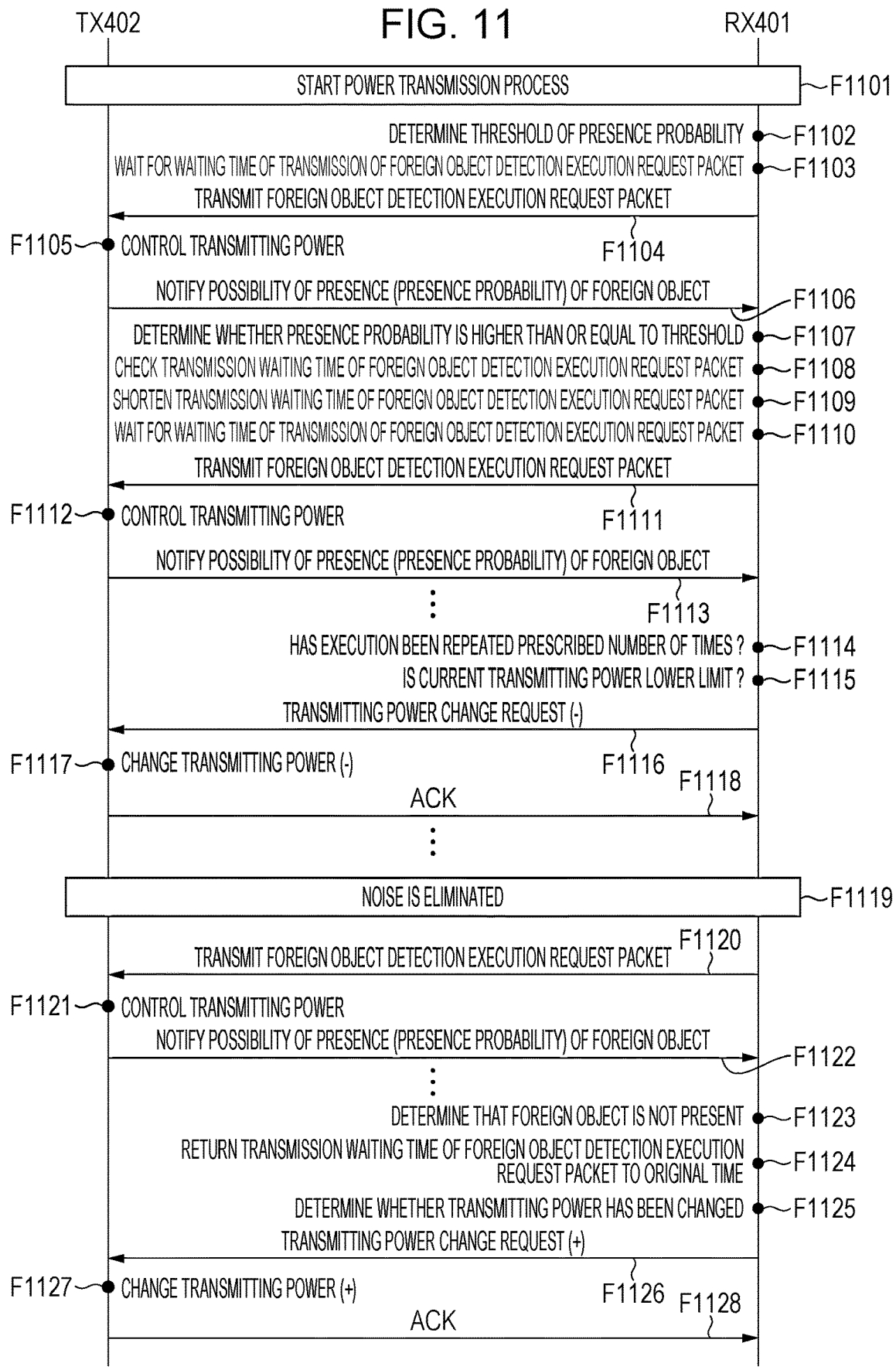
FIG. 11 is a view for illustrating the operation of the power receiving apparatus and the operation of the power transmission apparatus according to the second embodiment.

Next, the flow of the process in the present embodiment of the power receiving apparatus 401 (RX 401) and the power transmission apparatus 402 (TX 402) will be described with reference to the sequence diagram of FIG. 11. FIG. 11 is a process that is executed after the start of the power transmission process of F528. Here, as an example of the process, a process at the time when there appears an irregular part in the power transmission waveform during the transmitting power control period due to a temporal noise in executing transmitting power control in the waveform attenuation method will be described. The process of F1101 to F1104 is similar to the process of S901 to S904, so the description is omitted.

The TX 402 that has received the foreign object detection execution request of F1104 from the RX 401 executes transmitting power control and performs detection of a foreign object (F1105). Here, once is a predetermined number of times of transmitting power control, which the TX 402 uses to detect a possibility of presence (presence probability) of a foreign object. It is assumed that, in transmitting power control of F1105, although no foreign object is present, it is detected that "there is a low possibility that a foreign object is present" as the possibility of presence (presence probability) of a foreign object from an irregular part of the power transmission waveform during the transmitting power control period due to the influence of noise. The TX 402 notifies the detection result of F1105 to the RX 401 (F1106). The RX 401 that has received the notification of F1106 determines whether the notified possibility of presence (presence probability) of a foreign object is higher than or equal to the presence probability threshold determined in F1102 (F1107). Here, the RX 401 compares the notified possibility of presence (presence probability) of a foreign object with the threshold and determines that the presence probability is higher than or equal to the threshold.

The process of F1108 to F1111 is similar to the process of F918 to F921, so the description is omitted. The process of F1112 and F1113 is similar to the process of F1105 and F1106, so the description is omitted. While foreign object detection is repeatedly executed in the process similar to that from F1110 to F1113 in which the waiting interval to transmit a foreign object detection execution request is shortened, the RX 401 determines whether a predetermined number of times has been reached (F1114). After it is determined in F1114 that the predetermined number of times has been reached, the RX 401 determines whether the current transmitting power is set to a lower limit value (F1115). In the present embodiment, the lower limit value of the transmitting power is five watts, and the current power transmission output is 15 watts. Thus, in the determination of F1115, it is determined that the current transmitting power is not the lower limit value, and the RX 401 transmits, to the TX 402, a transmitting power change request to set the transmitting power to the lower limit value, that is, five watts (F1116).

The TX 402 that has received the power transmission output change request of F1116 changes the transmitting power to five watts (F1117) and transmits an ACK to notify the RX 401 that changing the power transmission output has been completed (F1118). In the present embodiment, the RX 401 executes the process of changing the transmitting power to the lower limit value through one operation. Alternatively, the transmitting power may be configured to be gradually decreased.

When the transmitting power is changed to the lower limit value, noise that has been influencing the power transmission waveform is eliminated (F1119). After the noise is eliminated in F1119, the RX 401 transmits a foreign object detection execution request to the TX 402 (F1120). The TX 402 that has received the foreign object detection execution request of F1120 from the RX 401 executes transmitting power control in the waveform attenuation method and performs detection of a foreign object (F1121). Here, because noise that has been influencing an irregular part of the power transmission waveform during the transmitting power control period in S1119 is eliminated, it is clearly determined that "no foreign object is present" as the possibility of presence (presence probability) of a foreign object. The TX 402 notifies the presence probability based on the determination result of F1121 to the RX 401 (F1122).

The RX 401 that has received the notification of F1122 repeatedly performs foreign object detection in the process similar to that from F1120 to F1122 and determines that no foreign object is present (F1123). In the present embodiment, since the number of times of transmitting power control is one in association with the process of F1123, the RX 401 performs determination from the result of multiple-time foreign object detection in light of the influence of noise or the like. Alternatively, the RX 401 may perform determination from the result of single-time foreign object detection. The RX 401 that has determined in F1123 that no foreign object is present returns the shortened waiting time to transmit a foreign object detection execution request to the time length before being shortened (F1124) and determines whether the transmitting power has been changed (F1125). In the present embodiment, since the transmitting power is changed from 15 watts to five watts, the RX 401 transmits a transmitting power change request to the TX 402 such that the power transmission output is returned to 15 watts (F1126). The TX 402 that has received the power transmission output change request of F1126 changes the transmitting power to 15 watts (F1127) and transmits an ACK to notify the RX 401 that changing the transmitting power has been completed (F1128).

In this way, when the RX 401 receives the notification that "there is a possibility that a foreign object is present" from the TX 402, the RX 401 shortens the transmission time of a foreign object detection execution request and decreases the transmitting power. Thus, the RX 401 and the TX 402 prevent a stop of transmission of electric power due to erroneous detection while reducing the possibility that a foreign object generates heat and are capable of continuing transmission of electric power. When a state where the transmission time of a foreign object detection execution request is shortened is continued, it is possible to early detect inclusion of a foreign object, so it is possible to implement a wireless power transfer system that is more safe and highly efficient.

Other Embodiments

The contents of the above-described first and second embodiments may be implemented in combination as needed. In the above-described embodiments, the TX 402 executes transmitting power control and performs foreign object detection from the waveform attenuation index. The following method is conceivable as another method of measuring a quality factor that is one of the waveform attenuation indices. In other words, there is a method of measuring a quality factor by transmitting a signal (for example, a pulse wave) having a plurality of frequency components, measuring the amplitude, attenuation state, or the like, of the waveform, and performing arithmetic processing (for example, Fourier transform) on the result. This may be applied to the above-described embodiments.

The present disclosure may also be implemented by a process in which a program that implements one or more functions of the above-described embodiments is supplied to a system or a device via a network or a storage medium and one or more processors in a computer of the system or device read and run the program. Alternatively, embodiments of the present disclosure may be implemented by a circuit (for example, ASIC) that implements one or more functions. The program may be recorded on a computer-readable recording medium.

The present disclosure is not limited to the above-described embodiments. Various changes or modifications are applicable without departing from the spirit and scope of the present application. Therefore, the following claims are attached to show the scope of the present disclosure.

According to the present disclosure, a detection process is further quickly executed again according to the result of a detection process for detecting an object different from a power transmission apparatus or a power receiving apparatus.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A power receiving apparatus comprising:
a power receiving unit configured to wirelessly receive power from a power transmission apparatus;
a transmission unit configured to transmit, with an interval, a packet including information on the received power in a power transfer phase;
a receiving unit configured to receive, from the power transmission apparatus, a response for the packet; and
a switching unit configured to switch to a first mode in a case where the received response is a predetermined response, and switch to a second mode in a case where the received response is not the predetermined response, wherein
the packet is transmitted with a first interval in the first mode,
the packet is transmitted with a second interval in the second mode, and the first interval is shorter than the second interval.

2. The power receiving apparatus according to claim 1, wherein
the predetermined response is a response including information representing that a probability of presence of a foreign object is higher than a threshold.

3. The power receiving apparatus according to claim 2, wherein the predetermined response is a response including information representing that the probability is higher than the threshold and lower than another threshold higher than the threshold.

4. The power receiving apparatus according to claim 3, wherein, in a case where the received response includes information representing that the probability is higher than said another threshold, the transmission unit transmits a request to stop a power transfer.

5. The power receiving apparatus according to claim 1, wherein the packet is a received power packet that is defined by the Wireless Power Consortium standard.

6. The power receiving apparatus according to claim 1, wherein, in a case where the received response is the predetermined response, the transmission unit transmits a packet to change power.

7. The power receiving apparatus according to claim 1, wherein the switching unit switches from the first mode to the second mode in a case where, after the packet is transmitted with the first interval, the predetermined response is received for the packet transmitted with the first interval.

8. The power receiving apparatus according to claim 1, wherein the interval is determined in advance for each of at least any one of the power receiving apparatus and the power transmission apparatus.

9. The power receiving apparatus according to claim 1, wherein the interval is determined in accordance with power transmitted from the power transmission apparatus.

10. The power receiving apparatus according to claim 1, wherein the interval is determined in accordance with a negotiation between the power receiving apparatus and the power transmission apparatus.

11. A method for a power receiving apparatus, the method comprising:
transmitting a packet including information on a received power in a power transfer phase;
receiving, from a power transmission apparatus, a response for the transmitted packet;
switching to a first mode in a case where the received response is a predetermined response; and
switching to a second mode in a case where the received response is not the predetermined response, wherein
the packet is transmitted with a first interval in the first mode,
the packet is transmitted with a second interval in the second mode, and
the first interval is shorter than the second interval.

12. A non-transitory computer-readable storage medium storing a program for causing a computer to execute a method for a power receiving apparatus, the method comprising:
transmitting a packet including information on a received power in a power transfer phase;
receiving, from a power transmission apparatus, a response for the transmitted packet;
switching to a first mode in a case where the received response is a predetermined response; and
switching to a second mode in a case where the received response is not the predetermined response, wherein
the packet is transmitted with a first interval in the first mode,
the packet is transmitted with a second interval in the second mode, and
the first interval is shorter than the second interval.

* * * * *